(12) United States Patent
Hoffman et al.

(10) Patent No.: US 11,629,748 B2
(45) Date of Patent: Apr. 18, 2023

(54) ADHESIVE BACKED POSITIONING AIDS AND ANCHORING ASSEMBLIES TO ENHANCE OBJECT MOUNTING EXPERIENCE

(71) Applicant: 3M INNOVATIVE PROPERTIES COMPANY, St. Paul, MN (US)

(72) Inventors: Joseph A. Hoffman, Minneapolis, MN (US); Tatiane Dias Marques Faria, Lake Elmo, MN (US); Craig D. Thompson, Inver Grove Heights, MN (US); Judd D. Olson, Deephaven, MN (US); Michele A. Eller, Stillwater, MN (US); Angela L. Pan, Arden Hills, MN (US); Landon B. Davis, Woodbury, MN (US); Thaddeus S. Rodda, III, St. Paul, MN (US); Margaret M. Bonello, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 53 days.

(21) Appl. No.: 17/057,046

(22) PCT Filed: May 22, 2019

(86) PCT No.: PCT/US2019/033594
§ 371 (c)(1),
(2) Date: Nov. 19, 2020

(87) PCT Pub. No.: WO2019/226816
PCT Pub. Date: Nov. 28, 2019

(65) Prior Publication Data
US 2021/0207645 A1 Jul. 8, 2021

Related U.S. Application Data

(60) Provisional application No. 62/792,128, filed on Jan. 14, 2019, provisional application No. 62/676,458,
(Continued)

(51) Int. Cl.
*F16B 45/00* (2006.01)
*A47G 1/16* (2006.01)
(Continued)

(52) U.S. Cl.
CPC ............ *F16B 45/00* (2013.01); *A47G 1/1633* (2013.01); *A47G 1/20* (2013.01); *A47G 1/17* (2013.01);
(Continued)

(58) Field of Classification Search
CPC ............ F16B 45/00; F16B 2015/0076; A47G 1/1633; A47G 1/20; A47G 1/17; A47G 1/22
See application file for complete search history.

(56) References Cited

U.S. PATENT DOCUMENTS

| 365,726 A | 6/1887 | Buckland |
| 1,175,802 A * | 3/1916 | Orcutt ..................... F16L 3/04 |
| | | 248/300 |

(Continued)

FOREIGN PATENT DOCUMENTS

| EP | 1346675 | 9/2003 |
| JP | 2016023689 | 2/2016 |

(Continued)

OTHER PUBLICATIONS

"Encyclopedia of Polymer Science and Engineering", Interscience Publishers, 1988, vol. 13, pp. 1-3.
(Continued)

*Primary Examiner* — Anita M King
(74) *Attorney, Agent, or Firm* — Ann K. Gallagher

(57) ABSTRACT

Wall anchors and positioning aids disclosed herein grant a user the ability to temporary hang or otherwise mount heavyweight objects, while also allowing for adjustment of at least one of the location and orientation of the assembly via the direct manipulation of the object.

17 Claims, 16 Drawing Sheets

Related U.S. Application Data filed on May 25, 2018, provisional application No. 62/675,528, filed on May 23, 2018, provisional application No. 62/675,594, filed on May 23, 2018.

(51) Int. Cl.
*A47G 1/20* (2006.01)
*A47G 1/17* (2006.01)
*A47G 1/22* (2006.01)
*F16B 15/00* (2006.01)

(52) U.S. Cl.
CPC .......... *A47G 1/22* (2013.01); *A47G 2001/207* (2013.01); *F16B 2015/0076* (2013.01)

(56) References Cited

U.S. PATENT DOCUMENTS

| | | | |
|---|---|---|---|
| 1,185,587 A | 5/1916 | Bragg | |
| 1,651,392 A | 12/1927 | Honigbaum | |
| 2,383,658 A | 8/1945 | Larson | |
| 2,497,615 A | 2/1950 | Lux | |
| 2,751,807 A | 6/1956 | Harre | |
| 3,020,602 A | 2/1962 | Siering | |
| 3,298,651 A | 1/1967 | Passer | |
| 3,416,821 A | 12/1968 | Benno | |
| 3,447,823 A * | 6/1969 | Resta | E04D 3/3607 403/387 |
| 3,966,157 A | 6/1976 | Corral | |
| 4,040,149 A | 8/1977 | Einhorn | |
| 4,124,189 A | 11/1978 | Einhorn | |
| 4,300,745 A | 11/1981 | Peterson | |
| 4,325,528 A | 4/1982 | Martin | |
| 4,333,625 A | 6/1982 | Haug | |
| 4,339,983 A * | 7/1982 | Okamura | B65D 5/6647 411/466 |
| 4,422,608 A | 12/1983 | Hogg | |
| 4,485,995 A | 12/1984 | Hogg | |
| 4,509,713 A | 4/1985 | Hogg | |
| 4,524,506 A | 6/1985 | Wilke | |
| 4,613,108 A | 9/1986 | Sundstroem et al. | |
| 4,621,473 A | 11/1986 | Wendt | |
| 4,637,583 A | 1/1987 | Babitz | |
| 4,771,974 A | 9/1988 | Carlson | |
| 4,795,294 A | 1/1989 | Takada et al. | |
| 5,267,718 A | 12/1993 | Sheehan | |
| 5,267,719 A | 12/1993 | Keller | |
| 5,269,485 A | 12/1993 | Dwinell | |
| 5,296,277 A | 3/1994 | Wilson | |
| 5,437,429 A | 8/1995 | Atlas | |
| 5,516,581 A | 5/1996 | Kreckel | |
| 5,588,629 A | 12/1996 | Barnes | |
| 5,795,636 A | 8/1998 | Keller | |
| 5,878,988 A | 3/1999 | Rakower | |
| 6,095,465 A | 8/2000 | Week | |
| 6,106,937 A | 8/2000 | Hamerski | |
| 6,126,126 A | 10/2000 | McKiernan, Jr. | |
| 6,206,334 B1 | 3/2001 | Week | |
| 6,231,962 B1 | 5/2001 | Bries | |
| 6,371,427 B1 | 4/2002 | Johnson | |
| 6,395,389 B1 | 5/2002 | Luhmann | |
| 6,403,206 B1 | 6/2002 | Bries | |
| 6,431,510 B1 | 8/2002 | Lydecker | |
| 6,478,273 B1 | 11/2002 | McKeirnan, Jr. | |
| 6,572,945 B2 | 6/2003 | Bries | |
| 6,830,228 B2 | 12/2004 | Ernst | |
| 6,972,141 B1 | 12/2005 | Bries | |
| 7,078,093 B2 | 7/2006 | Sheridan | |
| 7,226,032 B2 * | 6/2007 | Schlais | A47G 1/205 33/645 |
| 7,398,623 B2 | 7/2008 | Martel et al. | |
| 7,497,028 B2 | 3/2009 | Nevers | |
| 7,781,056 B2 | 8/2010 | Bries | |
| 7,836,604 B2 | 11/2010 | Paharik | |
| 8,318,303 B2 | 11/2012 | Lu | |
| 8,414,239 B2 * | 4/2013 | McDuff | F16B 15/00 411/487 |
| 8,667,765 B1 | 3/2014 | McCarthy | |
| 8,740,171 B2 | 6/2014 | Crescenzo | |
| 9,261,229 B2 * | 2/2016 | Callif | A47G 1/22 |
| 9,775,450 B2 | 10/2017 | Will | |
| 9,894,931 B2 | 2/2018 | Zhou | |
| 9,920,783 B2 | 3/2018 | Runge | |
| 10,197,217 B2 | 2/2019 | Will et al. | |
| 10,441,098 B2 * | 10/2019 | Bruno | B25C 3/008 |
| 10,454,190 B1 | 10/2019 | Martin | |
| 10,687,639 B2 | 6/2020 | Kan | |
| 10,772,444 B2 * | 9/2020 | Stas | A47G 1/22 |
| 10,895,099 B2 | 1/2021 | Vos | |
| 2003/0066941 A1 | 4/2003 | Beaty et al. | |
| 2003/0127578 A1 | 7/2003 | Skorka | |
| 2003/0178545 A1 | 9/2003 | Ernst | |
| 2004/0065027 A1 | 4/2004 | Birss | |
| 2005/0252156 A1 | 11/2005 | Martel et al. | |
| 2006/0182517 A1 | 8/2006 | McDuff | |
| 2006/0278804 A1 * | 12/2006 | Hagman | A47G 1/205 248/544 |
| 2007/0124910 A1 | 6/2007 | Peterson et al. | |
| 2007/0235622 A1 | 10/2007 | Baran | |
| 2007/0295879 A1 | 12/2007 | Wong | |
| 2008/0296456 A1 | 12/2008 | Lien | |
| 2010/0084539 A1 | 4/2010 | Popkin et al. | |
| 2011/0012006 A1 | 1/2011 | Serio | |
| 2012/0056051 A1 | 3/2012 | Gold | |
| 2014/0231604 A1 | 8/2014 | Long | |
| 2014/0326848 A1 | 11/2014 | Popkin | |
| 2015/0035556 A1 | 2/2015 | Kaltalioglu | |
| 2015/0035960 A1 | 2/2015 | Nakamura | |
| 2015/0297002 A1 | 10/2015 | Long | |
| 2016/0068722 A1 | 3/2016 | Schmitz-Stapela | |
| 2017/0000270 A1 | 1/2017 | Will | |
| 2017/0002973 A1 | 1/2017 | Will | |
| 2017/0002974 A1 | 1/2017 | Will | |
| 2017/0014733 A1 | 1/2017 | Massingill | |
| 2017/0015163 A1 | 1/2017 | Sielhorst | |
| 2017/0037892 A1 | 2/2017 | Higgins | |
| 2017/0112281 A1 | 4/2017 | Malott | |
| 2021/0239145 A1 | 8/2021 | Erekson et al. | |
| 2022/0279945 A1 * | 9/2022 | Hoffman | F16M 13/02 |

FOREIGN PATENT DOCUMENTS

| | | |
|---|---|---|
| WO | WO 2016-160364 | 10/2016 |
| WO | WO 2016-200769 | 12/2016 |
| WO | WO 2017/003988 | 1/2017 |
| WO | WO 2019-217567 | 11/2019 |
| WO | WO 2019-226809 | 11/2019 |

OTHER PUBLICATIONS

"Encyclopedia of Polymer Science and Technology", Interscience Publishers, 1964, vol. 1, pp. 1-24.
International Search Report for PCT International Application No. PCT/US2019/033594, dated Aug. 16, 2019, 7 pages.

* cited by examiner

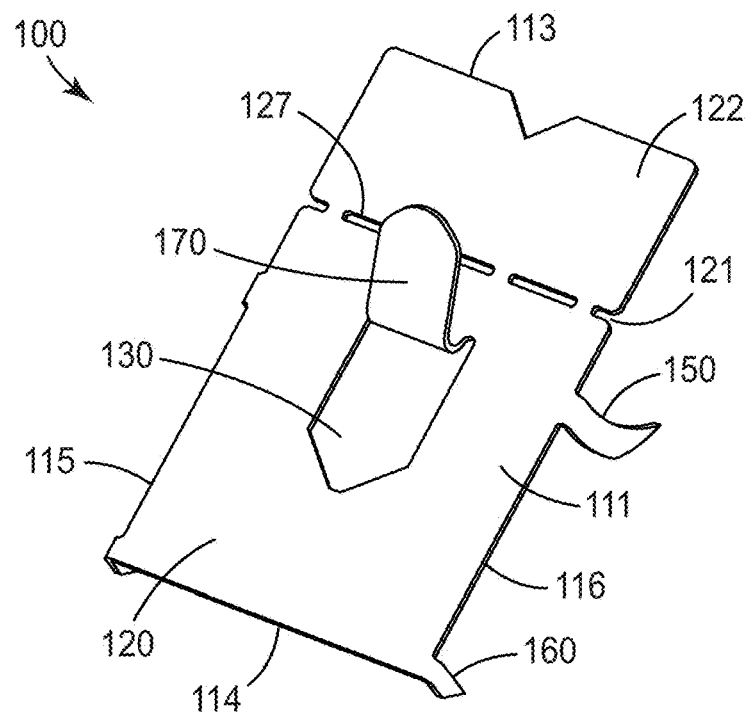
FIG. 3
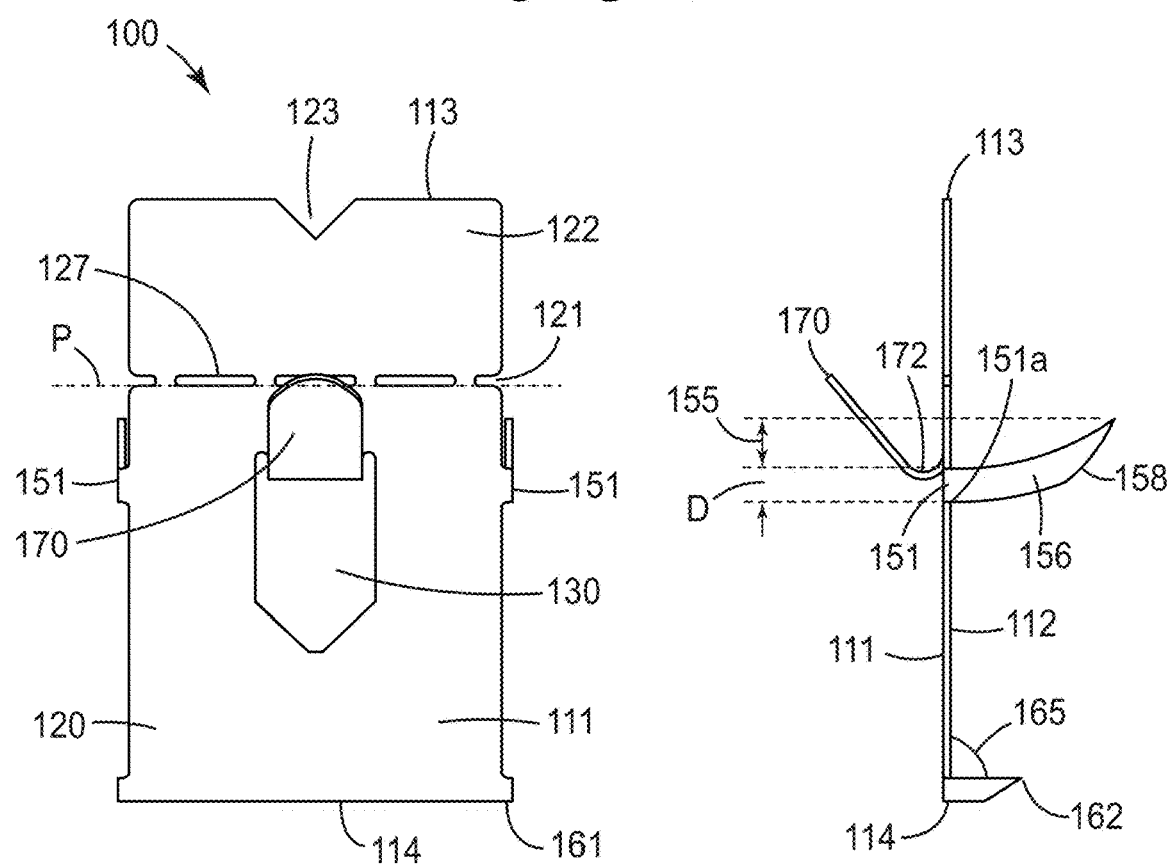
FIG. 4
FIG. 5

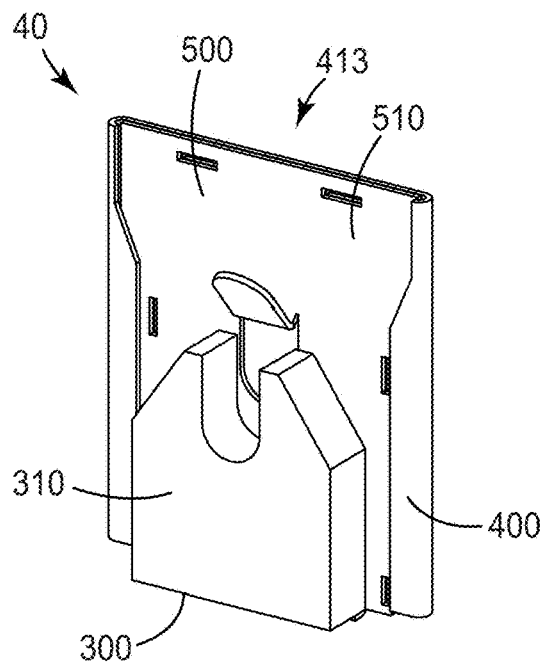
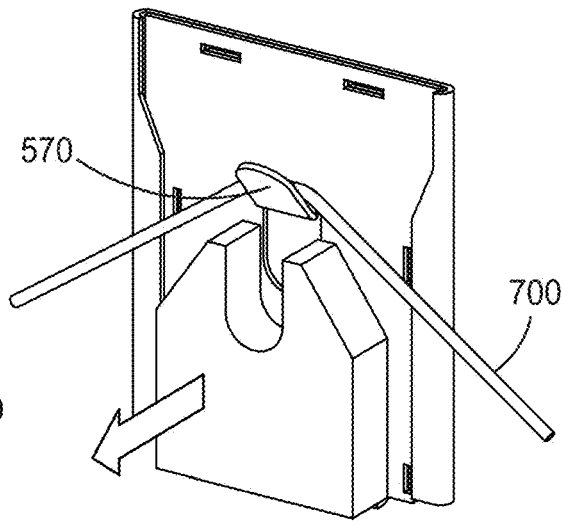
FIG. 12A    FIG. 12B
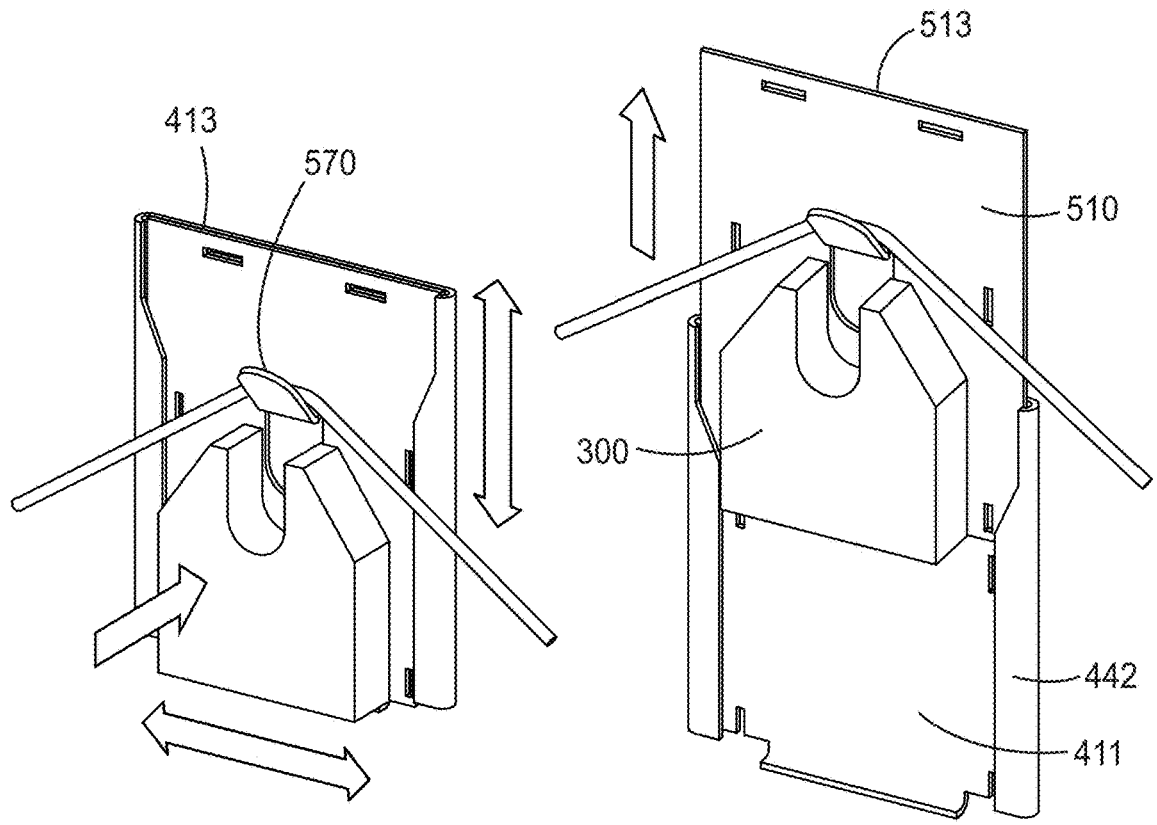
FIG. 12C    FIG. 12D

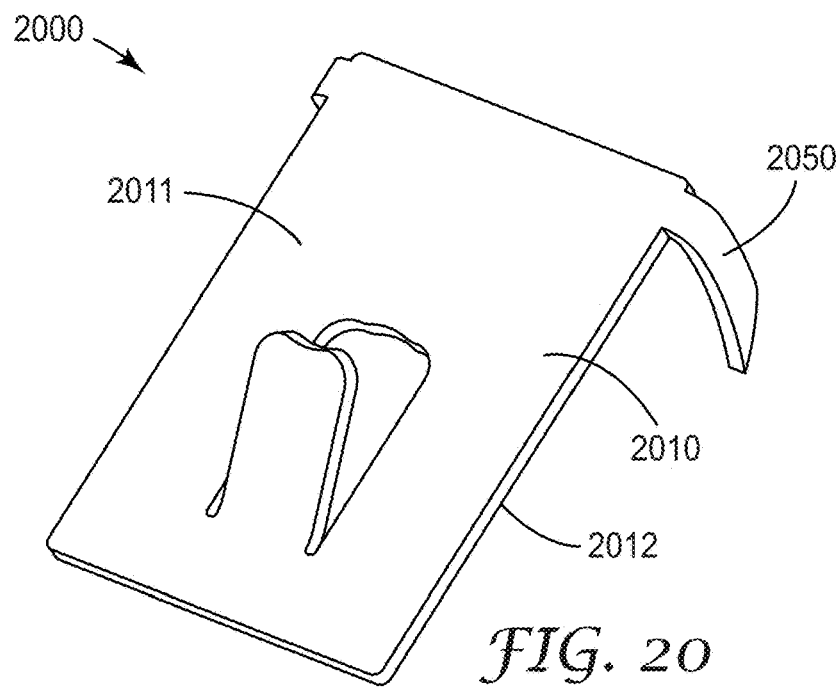
FIG. 20
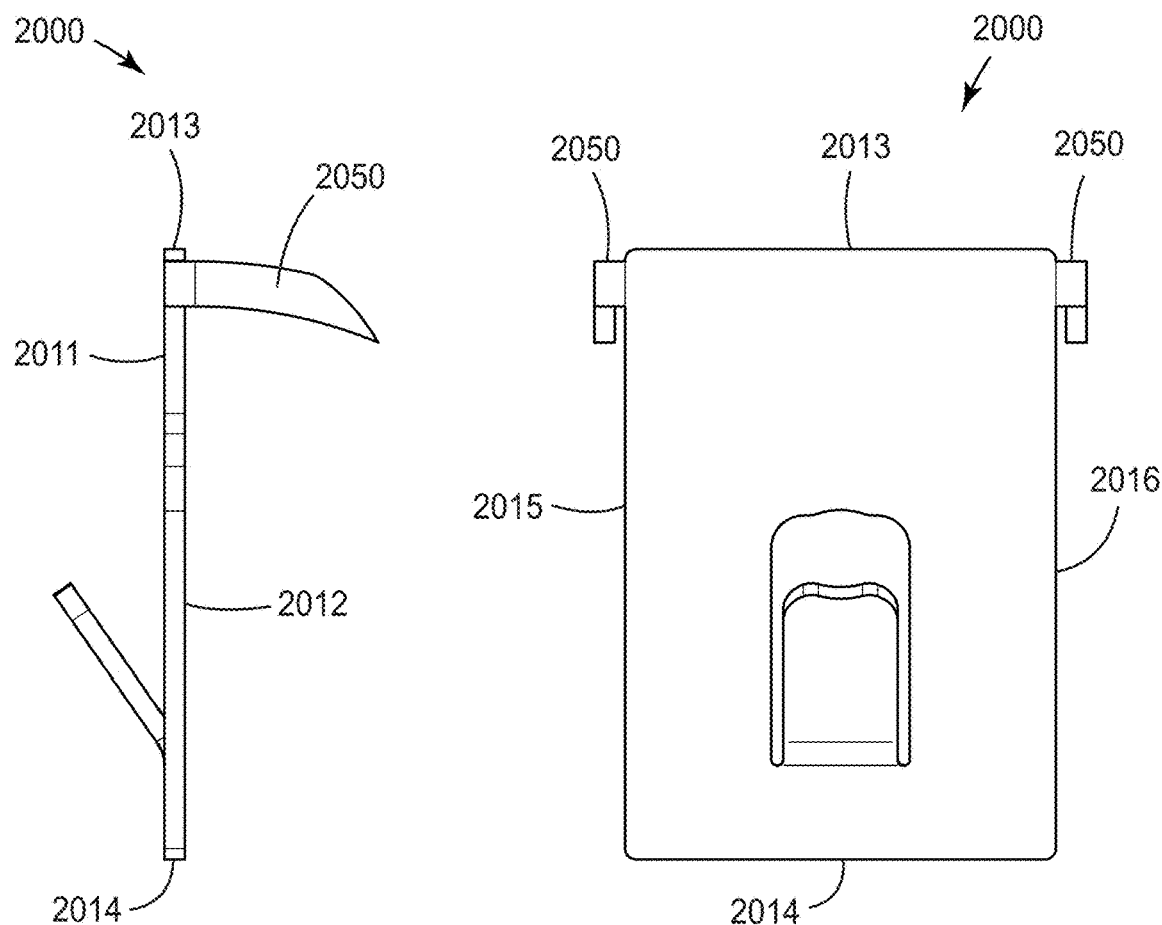
FIG. 21
FIG. 22

ADHESIVE BACKED POSITIONING AIDS AND ANCHORING ASSEMBLIES TO ENHANCE OBJECT MOUNTING EXPERIENCE

CROSS REFERENCE TO RELATED APPLICATIONS

This application is a national stage filing under 35 U.S.C. 371 of PCT/US2019/033594, filed May 22, 2019, which claims the benefit of provisional Application No. 62/676,458, filed May 25, 2018, and also claims the benefit of provisional Application 62/675,528, filed May 23, 2018, and also claims the benefit of provisional Application No. 62/675,594, filed May 23, 2018, the disclosure of which is incorporated by reference in its/their entirety herein.

BACKGROUND

Numerous products and devices exist for installing a mounting device, e.g., a hook, in a wall, such as for hanging a picture frame, a mirror, or the like. Conventional nails and screws are not always convenient solutions and may not provide sufficient support strength in the wall, particularly in the case of drywall, or other friable wallboards, which are relatively weak. Other mounting devices may avoid the use and attendant drawbacks of conventional fasteners, but nonetheless may result in excessive damage to the wallboard, require the use of conventional tools, or fail to consistently hold the desired weight.

SUMMARY

Some embodiments of the present disclosure generally relate to wall anchor assemblies that are self-locating. The self-locating feature eliminates the need to calculate, measure, and mark the exact location of the anchor on the wall. This greatly simplifies the mounting process by reducing the number of steps to accurately locate and mount an object. Many embodiments of the present disclosure do not require any additional tools for installation.

In one aspect, the present disclosure provides a wall anchor assembly comprising: a wall anchor including a base plate and a first prong; a pillow having an adhesive construction on a major surface thereof; and a spacer pad having at least one detachable interface.

In another aspect, the present disclosure provides a wall anchor assembly comprising: a frame having a front surface and a back surface, the frame including a guide on its front surface configured to receive an insert plate, the insert plate including a load bearing structure; an anchor including a curved prong having a base, wherein the prong extends outwardly along an arc to a wall-penetrating outer end; and a spacer pad attachable to a major surface of the insert plate, wherein the back surface of the base plate includes an adhesive construction.

In yet another aspect, the present disclosure provides a wall anchor assembly comprising: a base plate including opposing major surfaces; a first insert plate pivotably coupled to an edge of the base plate at a first hinge segment, a second insert plate pivotably coupled to the base plate at a second hinge segment disposed at an opposite edge of the base plate from the first hinge segment; and an adhesive construction on a major surface of the base plate, wherein each insert plate includes a curved prong extending from a surface of the respective insert plate at a location distal to the hinge segment.

In another aspect, the present disclosure provides a method for mounting an object, the method comprising: a providing an anchor assembly according to any one of claims 1-33; temporarily attaching a back surface of the assembly to a wall at a first location; placing the object on a loading bearing structure of the anchor assembly; manipulating, directly, the object so that the anchor assembly is disposed at a second location; and removing the object from the load bearing structure.

As used herein, "layer" means a single stratum that may be continuous or discontinuous over a surface.

As used herein "geometry" refers to the size and shape of an element.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly". As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The disclosure will be further described with reference to the drawings, wherein corresponding reference characters indicate corresponding parts throughout the several views, and wherein:

FIG. 3 is a perspective view of a wall anchor for use with the assembly of FIGS. 1-2;

FIG. 4 is a front, planar view of the wall anchor of FIG. 3;

FIG. 5 is a side-view of the wall anchor of FIGS. 3-4;

FIGS. 12A-12H illustrate side views of the wall anchor assembly of FIG. 11 used to mount a frame to a wall surface;

FIG. 20 is a front, perspective view of a wall anchor according to another embodiment of the present disclosure;

FIG. 21 is a side-view of the wall anchor of FIG. 20; and

FIG. 22 is a front plan view of the wall anchor of FIGS. 20 and 21.

Layers in certain depicted embodiments are for illustrative purposes only and are not intended to absolutely define the thickness, relative or otherwise, or the absolute location of any component. While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

Figure 1:
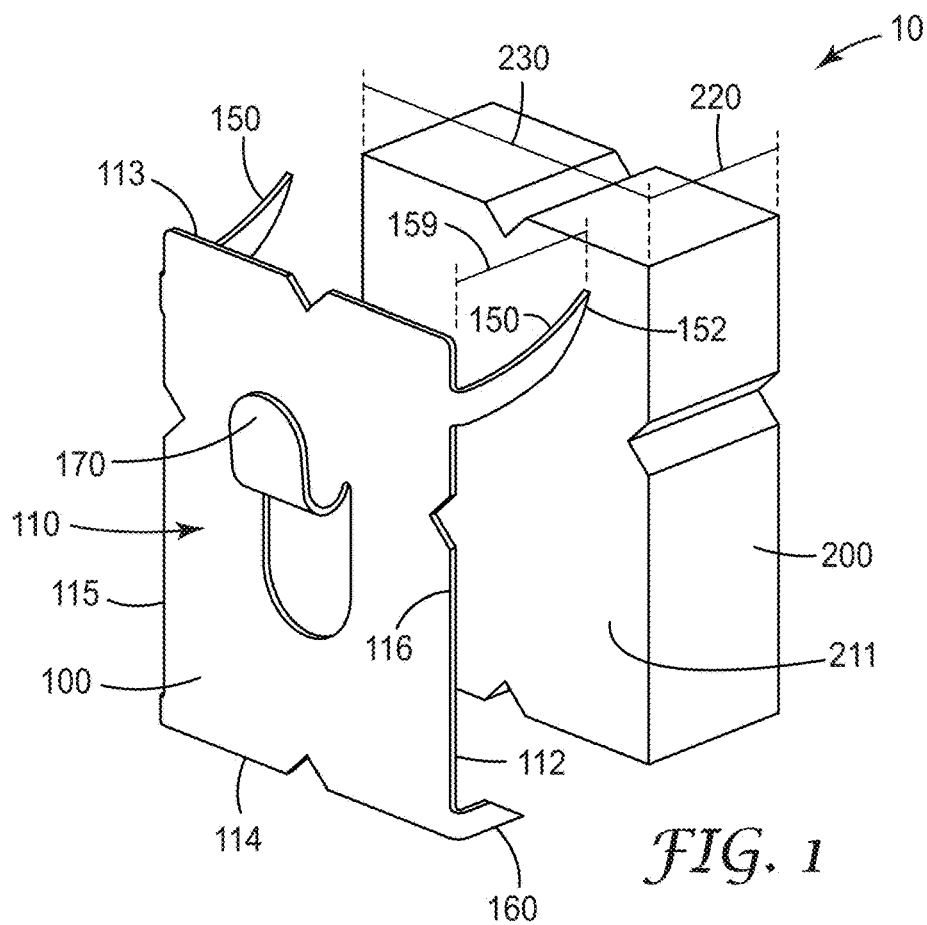
FIG. 1 is an exploded, perspective view of a wall anchor assembly according to an embodiment of the present disclosure.
Figure 2:
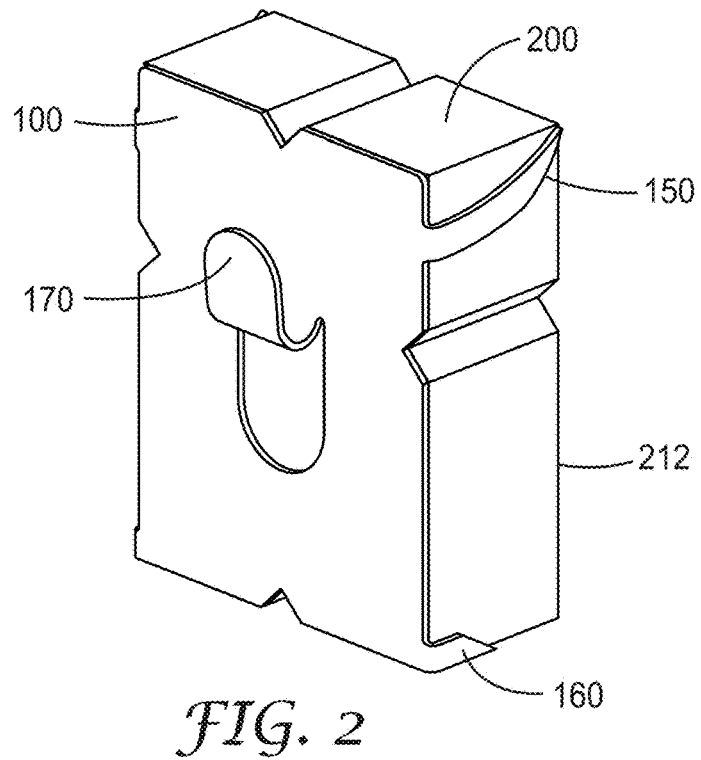
FIG. 2 is a perspective, assembled view of the wall anchor assembly of FIG. 1.

A wall anchor assembly 10 according to one embodiment of the present disclosure is depicted in FIGS. 1 and 2. The wall anchor assembly 10 includes a wall anchor 100 and an alignment pillow 200. The wall anchor 100 includes a base plate 110 presenting a generally rectangular shape. A pair of upwardly curved prongs 150 extend from each side edge 115, 116 (see FIG. 4) in direction generally orthogonal to a back surface 112. The prongs 150 extend to an outer end 152 that can be tapered to ease insertion when pressed into wall board. The alignment pillow 200 has an initial thickness 220 that is typically equal to or greater than the distance between the back surface 112 and the outer end 152 of a curved prong 150; the thickness 220 can be less than, equal, or greater than the end length 159 depending on the compressibility or collapsibility of the pillow 200. The width 230 of the pillow is typically configured to be equal to or less than the spacing width between prongs 150, allowing the prongs 150 to straddle the pillow and the back surface of the wall anchor to abut the front surface 211 of the pillow 200 during use. In other implementations, the width 230 may be greater than the spacing between prongs 150, with the pillow 200 compressible in the width direction or including apertures to receive the prongs 150

The pillow 200 may include a compressible material that reduces in volume upon application of light finger pressure (e.g., 0.2 to 1.5 MPa). The ratio of the compressed volume/initial volume (i.e., compressibility) will vary depending on the compressible material used. As used herein, compressible materials can include elastic and/or inelastic materials, depending on whether the material substantially rebounds after removal of application forces. The material can include any components that permit it to have the desired properties. Exemplary materials include foams (e.g., polymeric foams including, for example, cellulose foams, glass foams, polymeric foams, and combinations thereof), sponges, nonwoven fabrics, glass fibers (e.g., glass wool), ceramic fibers, cotton fibers, cellulose fibers, felt, rubber, woven mats, nonwoven mats, scrims, and combinations thereof. The pillow 200 may be a single continuous layer of material or may include multiple materials arranged in one or more layers.

The pillow 200 may also be collapsible, in that the deformation through the thickness in the direction of the wall is substantially permanent. Suitable collapsible materials include corrugated cardboard, collapsible foam, and other material including at least partially destructible voids. The pillow can also feature one or more biasing elements including, but not limited to, deflected beams, leaf springs, flat springs, hinged springs, compression springs (e.g., standard, conical, etc.), torsion springs (e.g., single, double, etc.), extension springs, barrel springs, and the like.

The back surface 212 of the pillow 200 may include an adhesive construction for temporarily securing the pillow 200 or assembly 10 to a wall surface. In such embodiments, the back surface of the assembly 10 is the wall-facing surface of the adhesive construction. For example, the back surface 212 may be coupled to a Command™ Adhesive Strip or a Command™ Picture Hanging Strip, both available from 3M Company. In some embodiments, the adhesive construction can include a pressure sensitive adhesive and a backing, while in other embodiments the adhesive construction includes only a continuous or discontinuous layer of pressure sensitive adhesive (i.e., backing free). A general description of useful pressure sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Pressure sensitive adhesive compositions are well known to those of ordinary skill in the art to possess properties including the following: (1) tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Suitable PSAs may be based on crosslinked or non-crosslinked (meth)acrylics, rubbers, thermoplastic elastomers, silicones, polyurethanes, and the like, and may include tackifiers in order to provide the desired tack, as well as other additives. In some embodiments, the PSA is based on a (meth)acrylic PSA or at least one poly(meth)acrylate, where (meth)acrylate refers to both acrylate and methacrylate groups. In some embodiments, the PSA is an olefin block copolymer based adhesive.

The adhesive construction used on the pillow 200 maybe peelable or stretch releasable. In embodiments featuring a stretch releasable construction, the construction can be removed from a surface by stretching it at an angle of less than 35°. In embodiments featuring a peel-releasable construction, the adhesive can be removed from a wall surface by stretching it an angle of 35° or greater. In some embodiments, the releasable adhesive may be removed by a combination of stretch and peel-release mechanisms.

A pillow 200 featuring one or more stretch release adhesive constructions can include, for example, any of the adhesives and constructions described in any of the following patents: U.S. Pat. No. 5,516,581 (Kreckel et al.); U.S. Pat. No. 6,231,962 (Bries et al.); U.S. Pat. No. 7,078,093 (Sheridan et al.); and U.S. Pat. No. 6,395,389 (Lühmann et al.), all of which are incorporated by reference herein in their entirety.

A pillow 200 featuring one or more peelable adhesive constructions can include, for example, any of the adhesives and constructions described in any of the following patent applications: International Publication Nos. 2015/035556, 2015/035960, U.S. Pat. No. 9,894,931, and PCT Application Nos. US2017/015163 and US2017/014733, all of which are incorporated herein in their entirety.

The adhesive construction may further include one or more release liners. The release liner can be, for example, on either or both of major surfaces of the adhesive layers. The release liner protects the adhesive during manufacturing, transit, and before use. When the user desires to use the adhesive construction, the user can peel or remove the release liner to expose the adhesive. Examples of suitable liners include paper, e.g., kraft paper, or polymeric films, e.g., polyethylene, polypropylene or polyester.

In presently preferred implementations, the adhesive construction is at least one of positionable and repositionable. As used herein, "positionable" means an adhesive construction that can be placed against a substrate surface and easily slid over the surface into proper position without preadhering or sticking the adhesive article to the substrate; pressure is generally required to adhere the adhesive construction to the substrate. As used herein, "repositionable" means an adhesive article that can be applied to a substrate and then removed and reapplied without distorting, defacing, or destroying the adhesive construction, or substrate; repositionable adhesives need not be positionable or vice versa. Such adhesives permit the pillow 200 to either slide over the surface of a wall, or be easily removed from the surface of the wall, until enough pressure is applied to enable an application bond to form between the adhesive and the surface of the wall.

In addition to positionable and repositionable adhesive formulations (e.g., the microsphere adhesives described in U.S. Pat. No. 8,318,303 to Lu), the adhesive construction may be rendered at least one or positionable or repositionable by engineered elements or surface features on the wall-facing surface of the adhesive. The engineered elements can act as spacers between the adhesive surface and wall to prevent full contact and wet out of the adhesive, whereby the article can be initially positioned or rotated by sliding the surface of the projections across the wall surface. Under certain conditions, the article may even be removed from the wall and placed at a new location. Once the location is selected, the separation created by the engineered elements can be overcome by applying sufficient pressure; the adhesive can contact and adhere to the wall. Engineered elements can include projecting adhesive "pegs" or "posts" (see, e.g., U.S. Pat. No. 5,296,277 (Wilson et al.) and U.S. Pat. No. 5,795,636 (Keller et al.)), discrete, partially embedded particles, discrete projecting clusters of particles (such as ceramic microspheres), non-adhesive islands including a deadening material, and combinations thereof. These elements are at least partially protrusive from the adhesive surface. Protrusive elements represent a departure or deviation away from the average elevation of an otherwise planar surface region. Any of the protrusive engineered elements may be combined with intrusive features. Intrusive features (e.g., recessed features) can generally be described as features having surface points that lie below an average elevation of the adhesive surface. In other implementations, intrusive features may be used in the absence of protrusive features. Additional information regarding positionable and repositionable adhesive constructions may be found in International Application No. PCT/US19/31339, assigned to Applicant and incorporated by reference in its entirety herein.

A wall anchor 100 according to one embodiment of the present disclosure is depicted in FIGS. 3-5. The wall anchor 100 includes a base plate 110 presenting a generally rectangular shape (as seen in FIG. 4). The base plate 110 includes a front surface 111 opposing a back, wall-facing surface 112, a top edge 113, a bottom edge 114, and opposing side edges 115, 116 connecting the top and bottom edges 113, 114 to define an outer plate perimeter. A pair of curved prongs 150 extend from each side edge 115, 116 (see FIG. 3) in direction generally orthogonal to the back surface 112. The prongs 150 extend to an outer end 152 that can be tapered to ease insertion when pressed into wall board.

The base 110 includes a lower section 120 including bottom edge 114 and an upper section 122 near the top edge 113. The sections 120 and 122 are typically coplanar and include front surfaces residing in a plane "P". The lower section 120 includes an open-ended region or recess 130 arranged generally aligned with the central axis of the base plate. The recess 130 generally corresponds in at least the width dimension to the width of a load bearing structure 170. The base plate 110 has an overall, generally rectangular shape when viewed in a plane perpendicular to the base plate plane "P". In other embodiments, the base plate 110 present another shape or combination of shapes in the same viewing direction, including circular, ovular, triangular tetrahedral, Y-shaped, etc. Other variations are contemplated and discernable by those of skill in the art.

The upper base section 122 includes an alignment notch 123 near the top edge 113 for visual confirmation of the anchor 100 placement and orientation on a wall surface. The upper section 122 is removably coupled to the lower section 120 through line of weakness 127. The line of weakness 127 may comprise perforations, recesses, apertures, combinations thereof, and other features capable of selectively reducing the structural integrity of a material. The line of weakness 127 allows the upper section 122 to be removed from the base plate 110 before or after the anchor 100 is secured to a wall surface, providing unfettered access to the load bearing structure 170. The upper section 122 may also be articulated at the line of weakness to improve the strength of the base plate 110 between the prongs 150. The presence of upper section 122 before insertion may enhance rotational forces available to the user during installation, due in part to the increased height (e.g., the distance between top edge 113 and bottom edge 114) of the base plate 110.

The lower frame section 120 includes a pair of curved prongs 150 proximate the top edge 121 and a pair of linear shanks 160 adjacent the bottom edge 114. The prongs 150 and shanks 160 each extend to an outer end 152, 162 over a length that is generally equal to or less than the thickness of the wallboard to which the anchor would typically be attached. The lengths of both the prongs 150 and shanks 160 can be varied to allow selection for a specific thickness of wallboard, with the curved prongs 150 typically having linear or arc length that is at least twice that of the shanks 160. Exemplary anchor 100 may also be useful without shanks 160, but the plurality of insertion points can improve the stability of the anchor 100 during installation, use, and removal.

The curved prong 150 can have a fixed radius of curvature, or have varying radii of curvature at various points, either discretely or continuous, along the outer profile of the prong 150 from the wall-base 151 to the outer end 152. The curvature produces a tip distance "D" from the top edge 151a of the prong base 151 to a plane parallel to the outer end 152, with greater curvature producing a greater tip distance D. While not wishing to be bound by theory or relation to gypsum wallboard, it is believed that an increase in tip distance leads to an increase in the weight that may be mounted on the anchor 100. In one exemplary embodiment, the tip distance D is about 0.15 inches. In depicted implementations, the prongs 150 are upwardly curved, in that the end 152 is closer than the top edge 151a to a plane including the top edge 113 of the base plate 110. In other circumstances, one or more prongs may include a downward curve (e.g., as in FIGS. 20-22).

The prongs 150 may include one or more flat surfaces and may comprise different cross-sectional shapes and combination of shapes (e.g., rectangular, circular, ovular, triangular etc.). For instance, an upper surface of a prong may be rounded, with a planar bottom surface to prevent crack propagation in the wallboard. The flat surface can also aid in the prevention of pullout due to stress concentrations on the wallboard. In the embodiment depicted in FIGS. 1-6, each prong 150 includes opposing, substantially planar side surfaces 156, each side surface extending in a plane generally orthogonal to the base plane "P". In other implementations, one or both edges 158 of the prong may be serrated.

Each of the prongs 150 include a height 155 and a thickness at the base 151. The thickness is measured in a direction parallel to the top edge 113 (e.g., the x-direction) and corresponds to the distance between prong side surfaces 156. A comparison of height 155 to thickness defines a prong aspect ratio. In presently preferred implementations, the aspect ratio is at least 3:1, at least 4:1; at least 5:1. In one exemplary embodiment, the height 155 can be about 0.10 inches and the thickness can be about 0.022 inches, resulting in a prong aspect ratio of 4.55:1. As further described below, the relatively thin nature of the prongs 150 reduces the needed insertion force, while the wallboard itself serves to prevent the buckling of the prong 150 as it is inserted. Relying on the wall to prevent buckling allows for the anchor to hold progressive heavier objects. The curved prongs 150 can taper in height over all or a portion of the arc length from base 151 to end 152.

Without wishing to be bound by theory, the prong aspect ratio can change the failure mode of the anchor by enhancing the strength of the prong in load-bearing directions (e.g., towards the bottom edge 113). The enhanced strength acts against the bending on the prong while the mounting of progressively heavier objects, potentially resulting in the destruction of the wallboard before the prong yields. A relatively high aspect ratio prong can accordingly perform to user expectations for more typical mounting hardware (e.g., nails, screws, etc.) while still reducing the work needed to install.

The shank 160 forms an angle 165 with the back surface 112 of the base. By way of example, angle 165 (e.g., taken relative to a plane parallel to the frame plane "P") may be between about 75 degrees and about 90 degrees (such as between about 80 degrees and about 90 degrees or between about 85 degrees and about 90 degrees), though variations are possible. In presently preferred implementations, the shanks 160 extend generally along a plane that is substantially orthogonal to the frame plane "P". Without wishing to be bound by theory, providing an excessively acute angle between a shank 160 and the back surface 112 tends to shear gypsum wall board. A slightly acute angle (e.g., an angle 166 of 80 degrees or greater), however, may ease insertion of the anchor 100 and assist in drawing the back surface 112 substantially parallel to the wall in certain embodiments. A shank may also be oriented at tilt, such that the shank base 161 is not parallel to either the lower edge 114 or a side edge 115, 116. Such an orientation may, under certain circumstances, improve the shear holding power of the anchor.

In the illustrated embodiment, and as can be seen particularly clearly from FIGS. 1, 3, and 4, the prongs 150 and shanks 160 can be formed from a monolithic piece of material that has been bent or otherwise articulated at select locations to form both base plate section 120, prongs 150, and shanks 160. Thus, each of the prongs 150 and shanks 160 include at least one section that is integral and substantially coplanar with a side edge 115, 116 of the frame 110. In other embodiments, one or more of the prongs and shanks may be soldered, welded, or otherwise attached to the back surface 112 of the frame 110 at an edge 115, 116 or other location spaced from the recess 130. Any of the prongs 150 and shanks 160 may be previously articulated when provided to a user, or the user may opt to bend each of the wall-penetrating components to the user's liking.

As depicted, both the prongs 150 and shanks 160 extend to coplanar endpoints, and prongs 150 each include the same radius of curvature. In alternative embodiments, either of the prongs 150 may be offset from the other along the length of the respective edge 115, 116, such that one prong base 151 is nearer to the top edge 113 than the other. Furthermore, the base plate 110 may include one or more prongs in addition to the depicted pair of prongs 150; such additional prong(s) may feature the same or different radius of curvature, height:thickness ratio, or position alongside a side edge 115, 116 or back surface 112 of the base plate 110.

A load bearing projection 170 extends outward from the front surface 111 of the base plate 110. The load bearing projection 170 as depicted is a hook including a base 172. The loading bearing structure used on the plate 110 may instead include a button, a ledge, a shank, or any number of load bearing structures used to hang articles. Furthermore, an anchor 100 may include two or more load bearing structures aligned along a longitudinal axis, a latitudinal axis, or both. In other embodiments, the front face of the base plate may feature a layer of adhesive (described in further detail below). As can be seen in FIGS. 3 and 4, the projection 170 is disposed on the front face 111 such that the hook base 172 is located above the bottom edge 151a of the prong base 151. It should be appreciated, however, that the projection 170 may be placed at any desired location on the front face 111, though such placements might reduce the shear holding capacity of the anchor and limit the type of objects that may be desirably mounted.

Like the prongs 150 and shanks 160, the load bearing projection 170 can be formed from a monolithic piece of material that has been bent or otherwise articulated at select locations to form both base plate section 120 and the load bearing structure 170. As depicted, the hook 170 can be created by cutting (e.g., die stamping, laser cutting, etc.) a portion of the base plate 110 along a path to form a hook outline, which can then be folded in the direction of top edge 113 to form the projection.

Figure 6B:
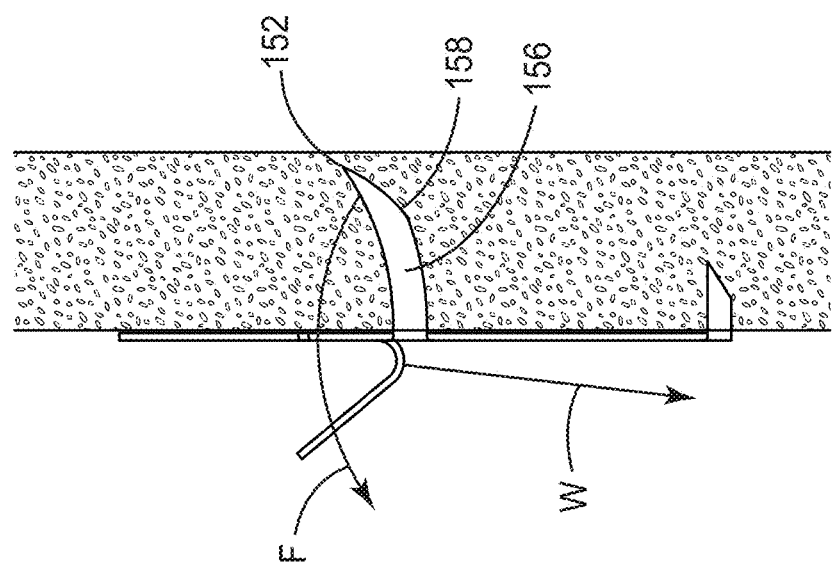
FIGS. 6A and 6B show side-views of the wall anchor of FIGS. 3-5 during and after insertion into a wall.
Figure 6A:
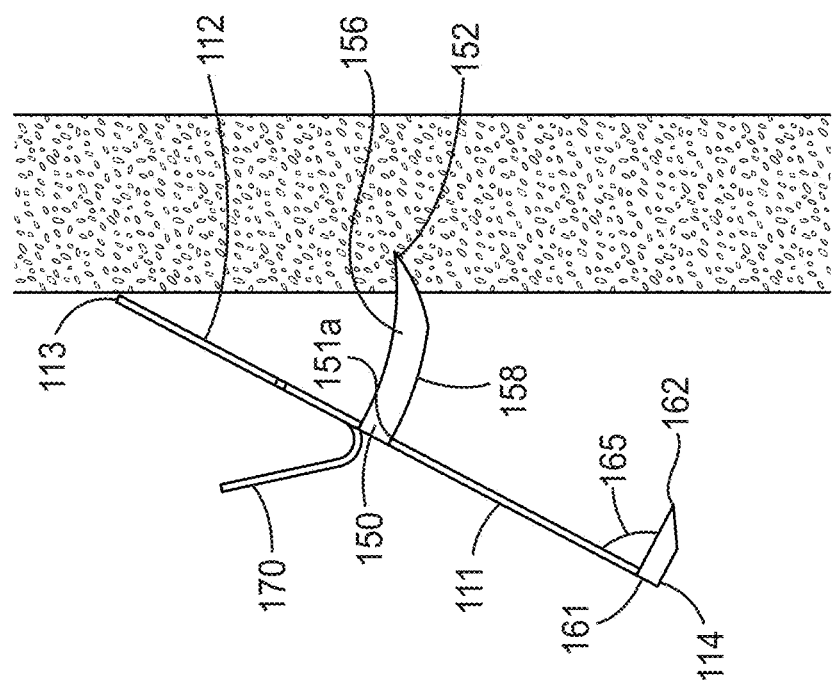

Referring to FIGS. 6A and 6B, one method for attaching the wall anchor 100 to a substantially vertical surface is illustrated. In a first step, the upper plate section 122 is positioned at the desired location of the wall, optionally using the alignment notch 123. The anchor 100 is rotated about 45-60 degrees so that the outer end 152 of each curved prong 150 extends horizontally toward the wall, with the outer point 152 at a desired entry point. Force is applied in direction orthogonal to the front face 111 of the lower section 120. The orthogonal force applied results in the anchor rotating about the upper edge 113 the outer end 152 of the prongs 250 penetrating the wallboard. Further rotation results in the remaining length of the prong being driven into the wallboard, followed by the insertion of the shanks 160 until the back surface 112 of the base plate 110 is generally flush with the wall. Optionally, the upper section 122 may then be removed along the line of weakness 127. Notably, the hook base 172 remains substantially aligned with or spaced above the insertion point of the prong ends 152 on the wall.

An object may be secured on the load bearing projection 170 before or after the anchor 100 has been inserted into the wall. Once an object is on the hook 170, it has a weight W that creates a force moment in the rotational direction away from the wall and downward. This translates to the force F that provides a bias or urging outwardly of the curved prong 150. This force also operates about the lowest edge 114 of the anchor 100, which functions as a pivot. The smaller the distance between the curved prong 150 and the pivot point, the greater the force F urging the anchor out of the wall. As can be seen with anchor 100, however, this force is distributed through the core of the wallboard above the curved prong 150. Having the force distributed above the prong 150 presents a considerable amount of material for the prong to tear through. Accordingly, the anchor 100 is less likely to dislodge from the wall or cause considerable damage to the wallboard.

For removal, the base plate may be lifted upwards by the lower section 121. The upper edge 113 (or 121, if upper section 122 is removed) naturally pivots upon itself and the anchor is dislodged as the outer ends 152 of the prongs 150 exit the wall. The lower section 120 may feature structures at the lower edge 113 to assist removal, such as a boss that can be engaged with a screwdriver, key or other implement or a hinged tab that may be engaged by a human finger.

In presently preferred implementations, the anchor is made of a metal material, however, it can be appreciated that other suitable materials can be used. The anchor 100 is typically made from a resilient metal or metal alloy, such as stainless steel, titanium, cobalt-chromium alloy (such as manufactured by Elgiloy Specialty Metals, Elgin, Ill.), or a shape-memory alloy such as an alloy of nickel and titanium (e.g., Nitinol). Preferably, the anchor 100 is sufficiently resilient so that the shape when relaxed does not significantly change during the course of mounting an object. As another option, the anchor 100 could be made from any other resilient material known to one skilled in the art, such as a flexible polymer or composite material. Moreover, although the anchor 100 is specifically discussed as mountable on a wall of gypsum wallboard, it can be utilized with walls of other materials or to secure an object to something other than a wall.

To use assembly 10, a user first removes any release liner from the adhesive construction on the back 212 of pillow 200, if present. The pillow 200 and anchor 100 are then placed at the desired location and secured to the wall surface using finger pressure in the direction of the wall. Once the user is satisfied with the location of the pillow 200, light finger pressure is applied to the front face 211, which causes the pillow 200 to compress and the outer ends 152 of the prongs 150 to pierce the wall board. The user may then separate the anchor from the pillow 200 and remove the pillow 200 from the wall if adhesively secured. Using the markings as guidance, the user may install the anchor 100 generally as described with respect to FIGS. 6A and 6B.

Figure 7:
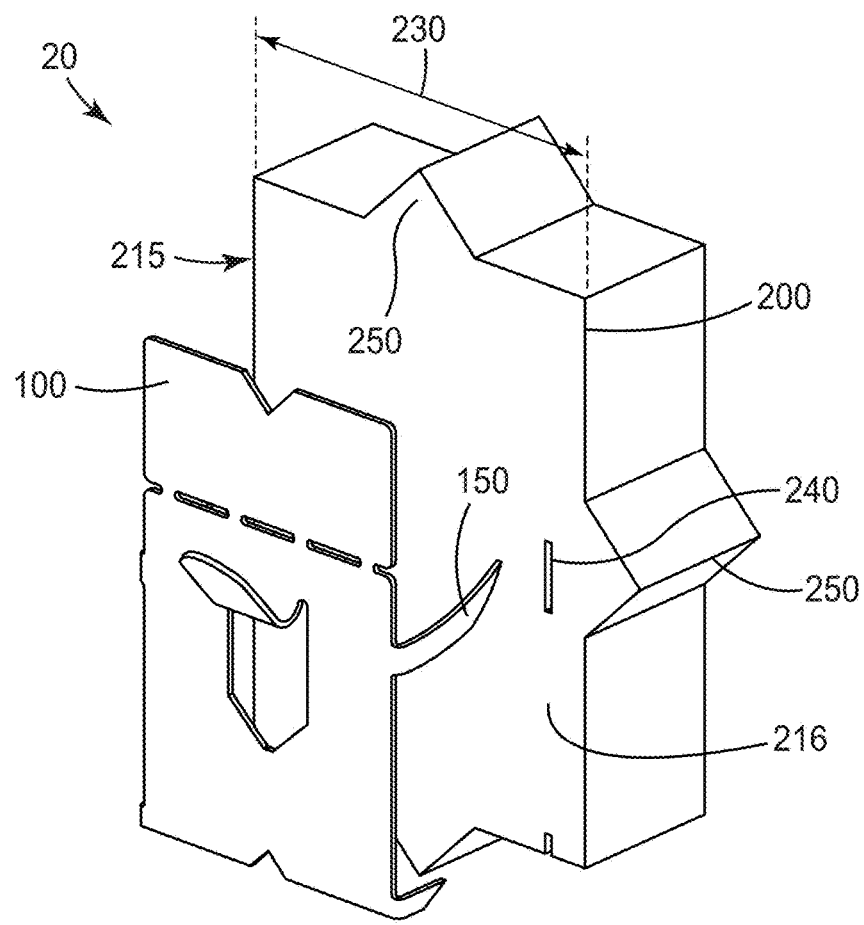
FIG. 7 illustrates a perspective view of a wall anchor assembly, according to another embodiment of the present disclosure.
Figure 8:
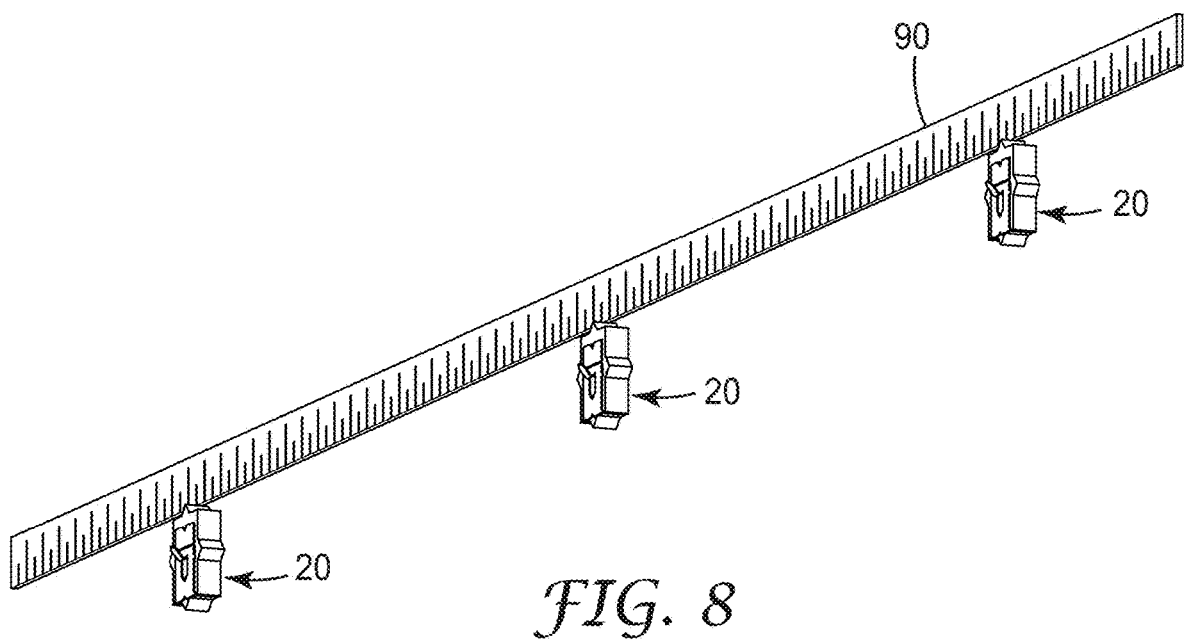
FIG. 8 illustrates a perspective view of a plurality of the wall anchor assemblies of FIG. 7 used to align wall markings.
Figure 9:
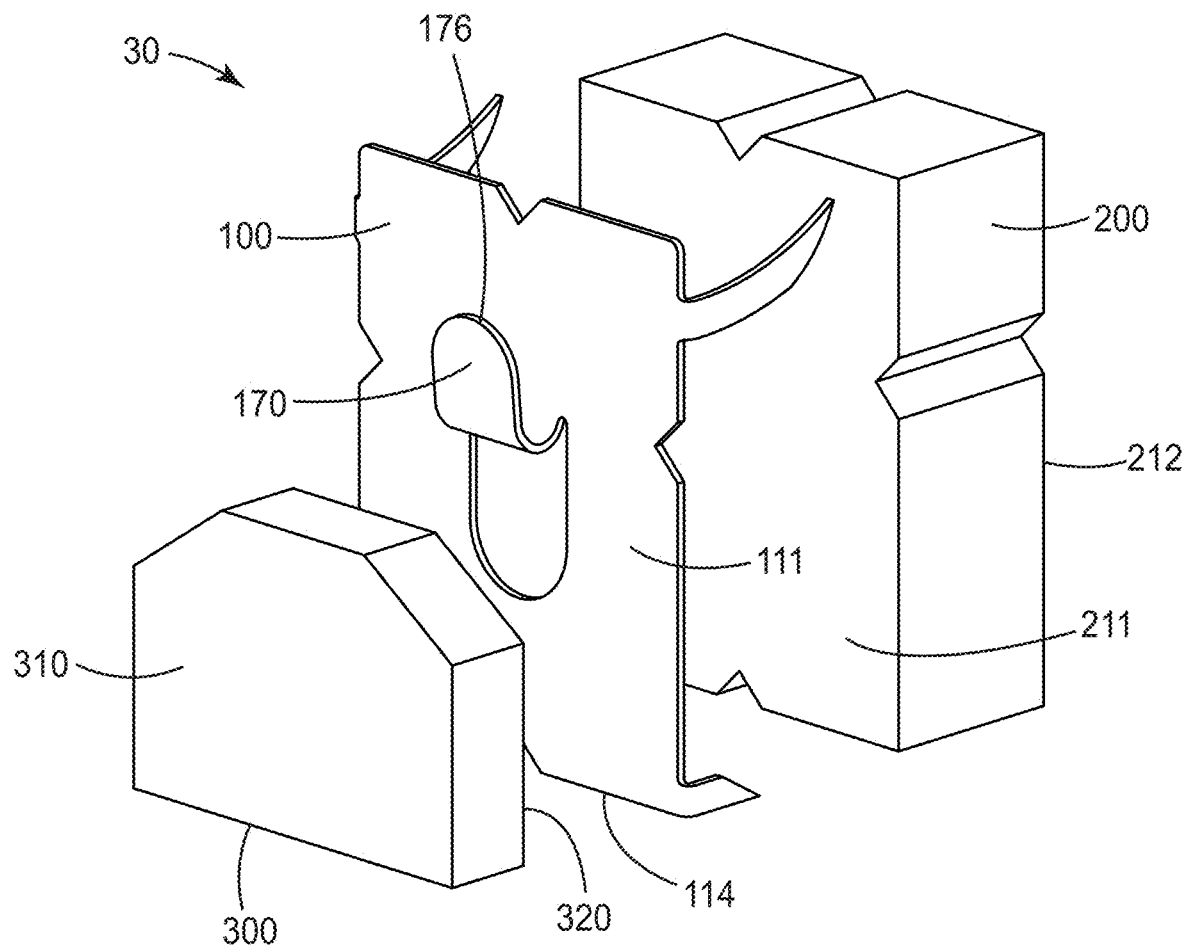
FIG. 9 illustrates a perspective view of a wall anchor assembly, according to another embodiment of the present disclosure.

A variation on the anchor assembly 10 is depicted in FIGS. 7 and 8. The anchor assembly 20 features a larger alignment pillow 200, in comparison to the width and height dimensions of the anchor 100. It is to be understood that many other aspects of anchor assembly 20 may have similar form and function to those described with respect to anchor 100 and these need not be repeated.

The alignment pillow 200 as depicted in FIG. 7 includes two insertion guides 240 spaced across the width 230 of the pillow 200, with each insertion guide adjacent a side edge 215, 216. The insertion guides 240 include an aperture extending through the thickness of the pillow 200. Each aperture is dimensioned to allow a curved prong 150 on the anchor 100 to reach the intended wall surface when the pillow 200 is compressed. The alignment pillow 200 further includes edge projections 250 extending form the top, bottom, and side surfaces. The edge projections 250 are designed to assist a user with orientation, location, and leveling of the anchor assembly 20 prior to insertion. As depicted in FIG. 8, the edge projections may also assist in measurement to accurately position an object (e.g., a picture frame) by serving as a rest for a ruler 90 or other instrument of measure. Though depicted as resembling prisms, the edge projections may be any suitable shape or combination of shapes. The pillow 200 of anchor assembly 10 or 20 may include an alignment notch (not shown) at an edge thereof, in a corresponding location to an alignment notch 123 on the wall anchor 100.

In alternative implementations of the present disclosure, a pillow may be dimensioned and configured to accommodate other wall anchors and conventional fasteners in addition to or in lieu of anchor 100. For example, the pillow may be configured for assembly with the anchors featured in U.S. Pat. No. 8,414,239 (McDuff); U.S. Pat. No. 3,298,651 (Passer); and U.S. Pat. No. 3,966,157 (Corral et al.). Further exemplary anchors include those of US Patent Publication Nos.: 2017/0002973 (Will et al.); 2015/0297002 (Long); and 2007/235622 (Barran et al.). Other anchor structures and assemblies are possible for use with the pillow and apparent to those of skill in the art.

Turning now to FIGS. 9 and 10A-10H, an additional component for use with the anchor assemblies of the present disclosure is depicted. The anchor assembly 30 includes a wall anchor 100, an alignment pillow 200, and a spacer pad 300. It is to be understood that many aspects of wall anchor 100 and pillow 200 have similar form and function to those described with respect to anchor assemblies 10 and 20, and these need not be repeated to those of skill in the art.

The spacer pad 300 includes a front surface 310 and a back surface 320. The spacer pad 300 is received on the front surface 111 of anchor 100, aligned with the bottom edge 114 and residing below the base of the load bearing structure 170. The pad 300 has a thickness 306 greater than the shortest distance between the distal end 176 of the load bearing structure 170 and the front surface 111 of the anchor base 110, such that the pad 300 extends outward beyond the outermost edge of structure 170. While depicted as being a separate structure, the spacer pad 300 could also be made integral with the pillow, creating a recess or cradle for receipt of a wall anchor. The spacer pad 300 is typically made from the same type of material as the pillow 200, but can be made from any suitable material capable maintaining a shape in two or more dimensions.

Both the front and back surface 310, 320 of the discrete spacer pad 300 can include a detachable interface, which can include any of the adhesive constructions described above. The detachable interface allows the spacer pad 300 to be repeatedly separated from either or both of an object to be mounted and a wall anchor. The detachable interface permits the separation and connection of the pad along a general plane. In some embodiments, the detachable interface can include, for example, a mechanical type fastener including an interlocking system, an intermeshing system having connection without macroscopic mechanical deformation or interference, a releasable contact responsive fastener, a splittable construction, and the like. Suitable detachable interfaces are explored for example, in U.S. Pat. No. 9,920,783 (Runge et al.). In presently preferred implementations of the wall anchor assembly 30, each detachable interface is a removable adhesive of the types described above.

Figure 10A:
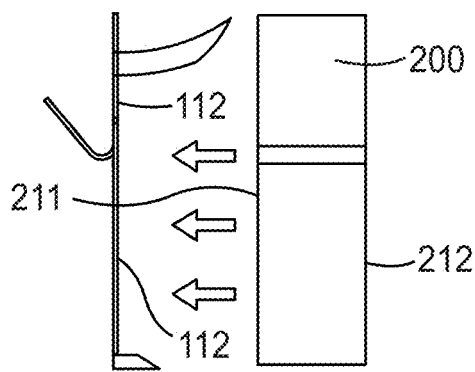
FIGS. 10A-10H illustrate side views of the wall anchor assembly of FIG. 9 used to mount a frame to a wall surface.
Figure 10B:
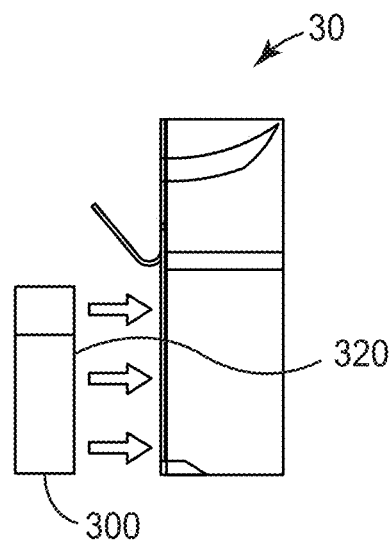
Figure 10C:
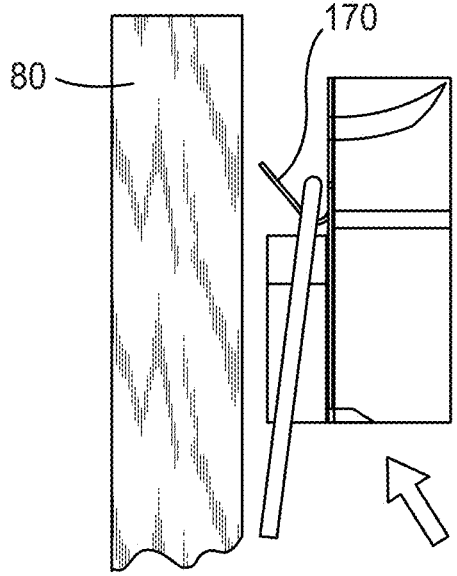
Figure 10D:
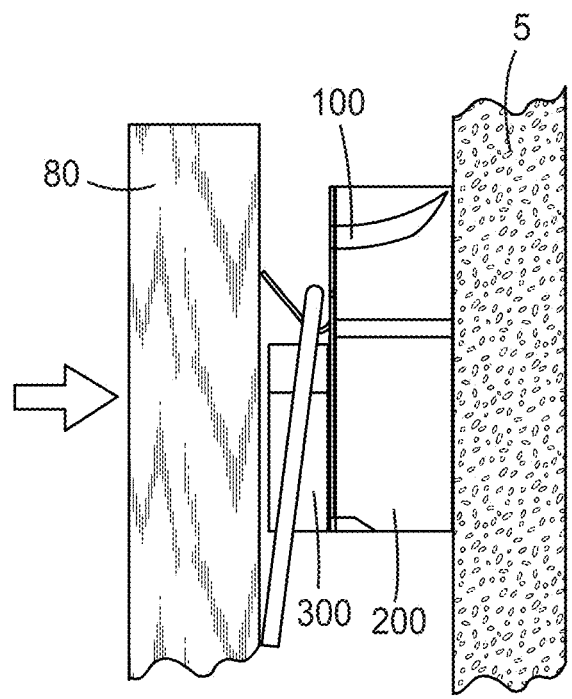
Figures 10E, 10F:
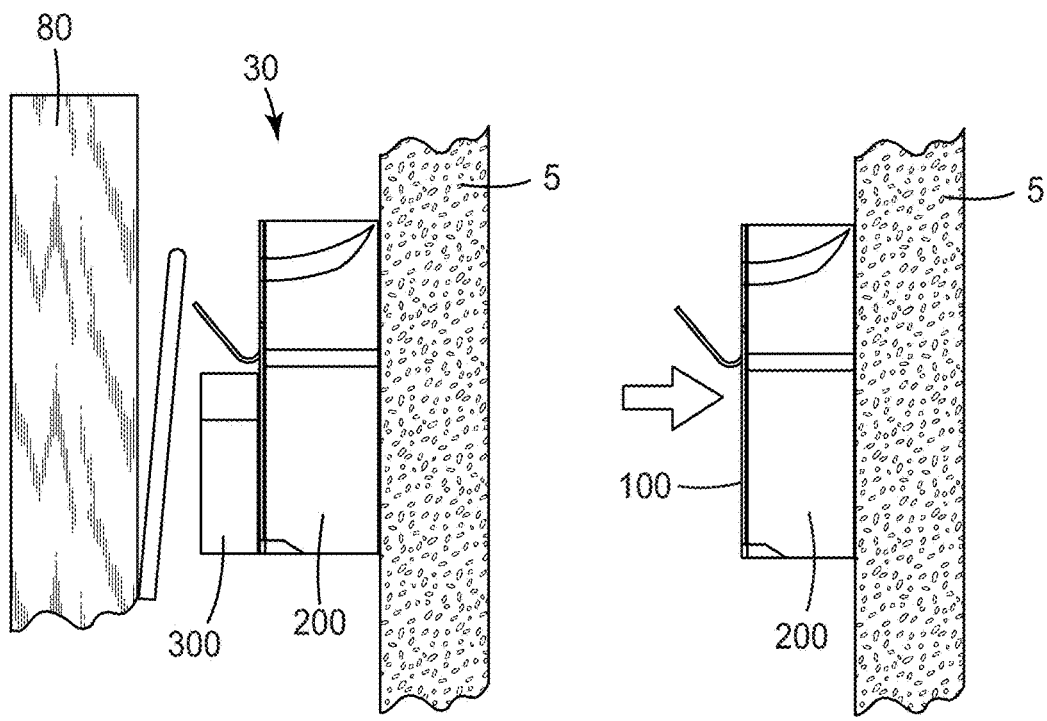
Figures 10G, 10H:
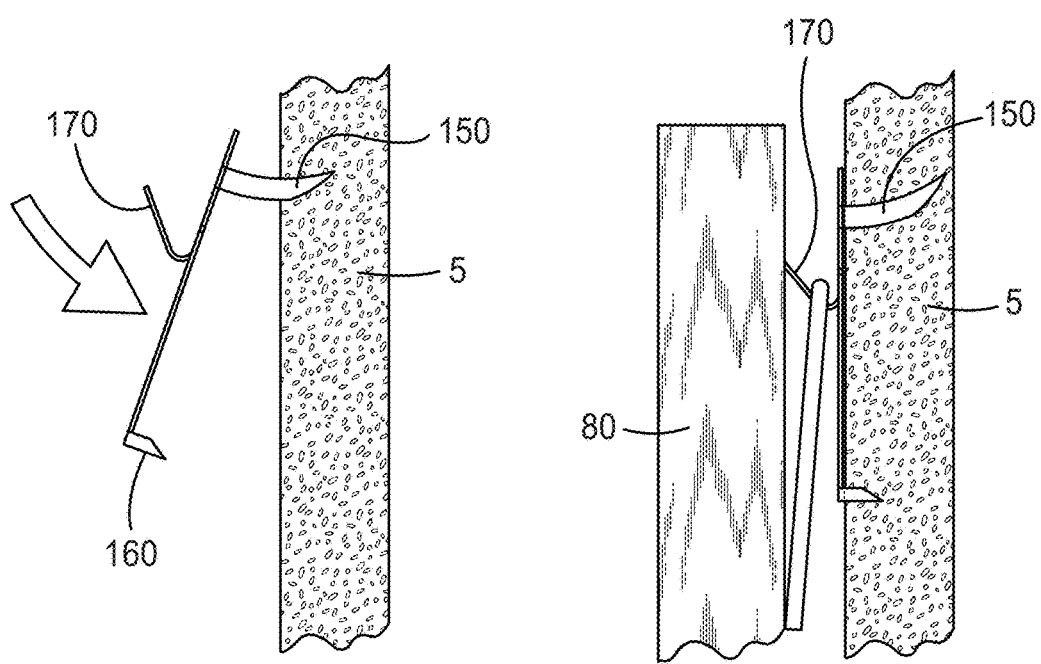
Figure 11:
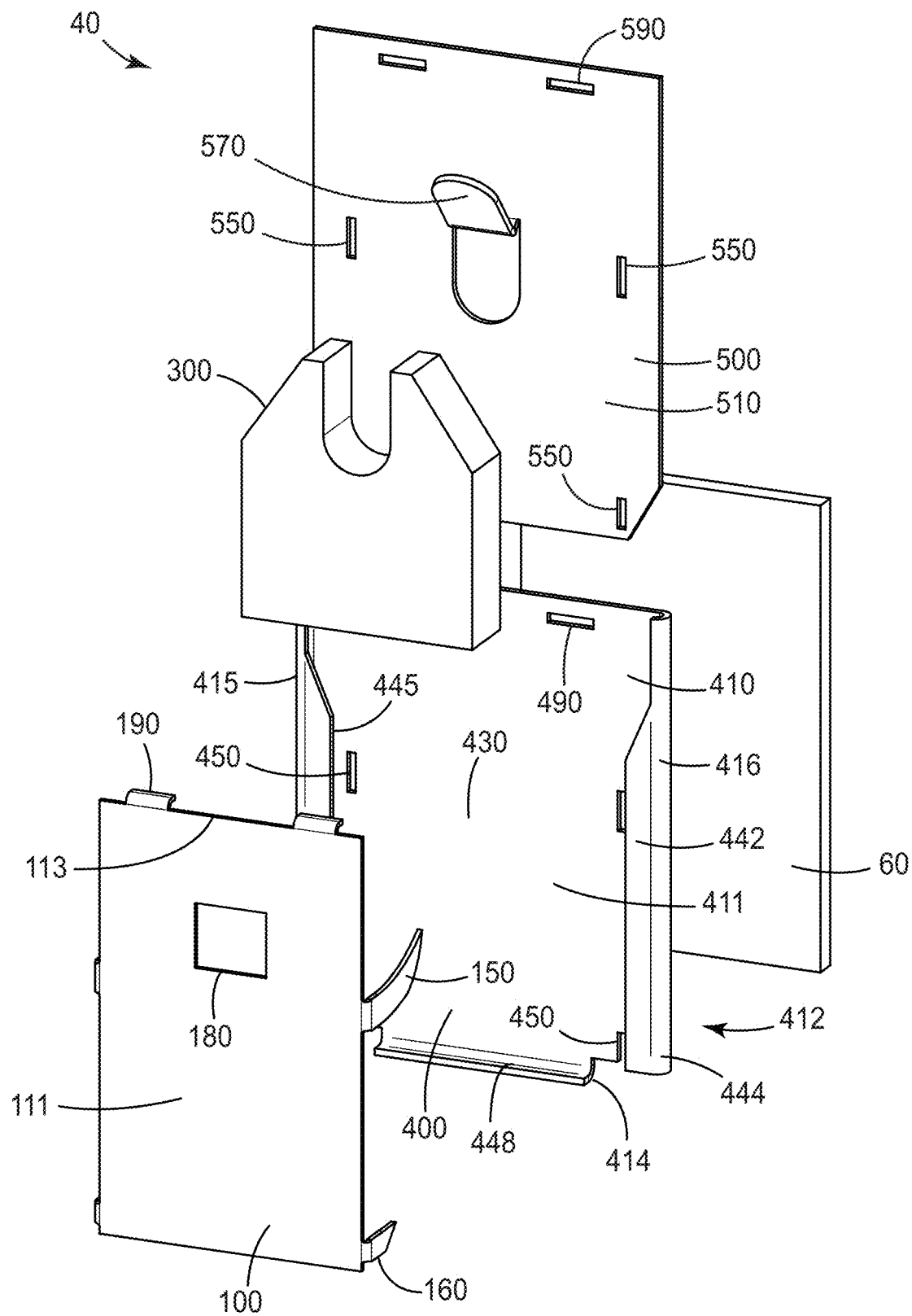
FIG. 11 illustrates a perspective view of a wall anchor assembly, according to yet another embodiment of the present disclosure.

A method of using the wall anchor assembly 30 is illustrated in FIGS. 10a-10h. In a first step, the anchor 100 is coupled to the pillow 200, such that the back surface 112 of the base plate 110 is in contact with (or near) the front surface 211 (FIG. 10A). The spacer pad 300 is attached to the front surface 111 of the anchor base plate 110 (FIG. 10B). One or both of these steps may be performed by the manufacturer or retailer, such that user does not participate in initial assembly. Next, the mounting object (as depicted, picture frame 80) is placed on the load bearing structure via, e.g., wire, bracket, or d-ring (FIG. 10C) and the front surface 310 of the pad 300 is attached to the object (FIG. 10D). If the mounting object includes a wire, it is presently preferred that wire is drawn taut on the load bearing structure 170. The user can position and orient the assembly at the desired location on the wall surface 5 by moving (e.g., sliding or rotating) the mounting object directly. Once the user is satisfied with the location of the object after one or more movement steps, the user applies pressure to the object to adhere the assembly 30 to the wall 5. If a repositionable adhesive is used, the user may elect to first secure the pillow to the wall and subsequently move the assembly to the desired position. The object is then decoupled form the load bearing structure 170 and the assembly 30 remains on the desired location on the wall (FIG. 10E). Following confirmation that the assembly 30 is in the correct position and orientation, the user removes the spacer pad 300 and presses the outer ends 152 of the prongs into the wall 5. (FIG. 10F). Alternatively, the spacer pad 300 can be removed after the initial prong marking step. Further disassembly of the anchor 100 and pillow 200 allows the anchor 100 to be rotatably inserted into the wall 5 at the location corresponding to the earlier marks. (FIG. 10G). Once the anchor is substantially flush with the wall 5, the object 400 may be once again secured to the load bearing structure 170 (FIG. 10H).

The anchor assembly 30 is particularly advantageous for large objects like picture frames, as the user may position the object at or near the desired location and temporarily secure the object to a wall surface. The temporary attachment reduces the guess work and repeat attempts typically attendant mounting large objects. Moreover, the user may directly manipulate the object, instead of relying on indirect adjustment of anchors or other hardware.

Turning to FIGS. 11 and 12A-12H, another embodiment of a wall anchor assembly 40 according to the present disclosure is depicted. Wall anchor assembly 40 includes a frame 400 and an insert plate 500. The frame 400 includes a guide featuring rails 442, 448 cooperating with a frame body 410 to define a recess 430. The recess 430 includes a continuous back plate, such that a portion of the frame 400 is disposed between the insert 500 and wall when the anchor assembly 40 is assembled. The insert 500 includes a load bearing projection 570 and is dimensioned to slidably engage the guide. The assembly 40 further includes a spacer pad 300 and an anchor 100. Unlike previous embodiments, the anchor 100 lacks a load bearing structure and instead includes an aperture 180 dimensioned to accommodate the load bearing projection 570 on the insert plate 500. It is to be understood that many other aspects of anchor assembly 40 may have similar form and function to those described with respect to anchor assemblies 10, 20, and 30, and that similar aspects need not be repeated to one of skill in the art.

The frame 400 includes a generally planar body 410 having a front surface 411, a back surface 412, opposing top and bottom edges 413, 414, and opposing side edges 415, 416. The front surface 411 resides in a first frame plane and the back surface 412 resides in a plane parallel to the front plane. The frame body 410 is generally rectangular when viewed in a plane perpendicular to the first frame plane. In alternative embodiments, however, the frame body may take on another shape or combination of shapes, including circular, ovular, triangular, tetrahedral, Y-shaped, etc. A back surface 412 of the frame 400 can include an adhesive construction 60 for temporarily attaching the frame 400 and assembly 40 to a wall surface.

The guide extends around the at least a portion of the periphery of the frame and includes opposing rails 442 integral with the side edges 415, 416, and a stop wall 448 extending along the bottom edge 414 of the body 410. The rails 442 are coupled to the respective section of the frame via a guidewall 444, which is arranged substantially perpendicular to the first frame plane. Each rail 442 is spaced from the first frame plane according to the height of the guidewall 444, which generally corresponds to a thickness of the insert 150.

The rails 442 serve to accept and guide the insert 500 into the bottom of the recess 430, while the bottom stop wall 448 acts as a stop surface or detent to arrest sliding of the insert 500 in the direction of the bottom edge 414. As depicted, each rail 442 extends the full length of the recess 430 to the top edge 413 of the frame body 410. The stop wall 448 can be centrally located on the third section, and does not connect to either one of the side rails 442. In other embodiments, one or both side rails 442 may extend only a portion of the recess length; in the same or other embodiments, the stop wall 448 can extend the full width of the bottom edge 414.

The rails 442 extend over and into the recess 430, forming an overlay surface 445 facing the frame plane "P". The stop wall may also extend over and into recess 430, though this is not strictly necessary. The overlay surface 445 limits or prevents rotational movement of the insert 500 about an axis coincident with a loading bearing projection 570 when the anchor 40 is assembled, as well as operating to aid the placement of the insert 500 within the recess 430. As one skilled in the art can appreciate, there may be appropriate tolerances between the rails 442 and the dimensions of the insert 500 to facilitate sliding of the insert 500 relative to the frame body 410 and avoid binding. The spacing of the overlay surfaces 445 also allows a front surface 510 of the insert 500 to reside directly adjacent the frame plane "P", allowing the back surface 412 of the frame body 410 to remain generally flush with the wall. The insert plate 500 may also include active or activatable features to frictionally engage one or more surfaces of the base plate 400.

Both the frame body 410 and insert plate 500 include one or more pairs of insertion guides 450, 550, respectively spaced across a given width, with each insertion guide adjacent a respective side edge. The insertion guides 450, 550 include an aperture extending through the plate or frame, respectively. Each aperture is dimensioned and disposed to allow a curved prong 150 or shank 160 on the anchor 100 to reach the intended wall surface when insert plate 500 is fully received in the recess 430. The frame body 410 and insert plate also includes rotation apertures 490, 590 adjacent the respective top edges 413, 513; the rotation apertures 490, 590 are dimensioned to receive arcuate tabs 190 on the top edge 113 of anchor 100. The rotation apertures 490, 590 and arcuate tabs 190 cooperate to align the curved prongs 150 relative to the insertion guides 450, 550 and promote the proper rotational insertion of the anchor into a wall. One of skill in the art will appreciate that the anchor 100, frame 400, and insert 500 may be assembled without the use of rotation apertures or arcuate tabs.

In order to assemble the anchor assembly 40, a user or manufacturer may slide or otherwise move the insert plate 500 through the insert guide until the bottom edge 513 engages or is otherwise adjacent the bottom rail 428 and the insertion guides 450, 550 align. Next, the spacer pad 300 is secured to the front face 511 of the insert plate 500 below the loading bearing projection 570. One or both of these steps may be performed by the manufacturer or retailer, such that user does not participate in initial assembly. The anchor 100 is kept separate from until later in the anchor assembly installation process.

Figure 12E:
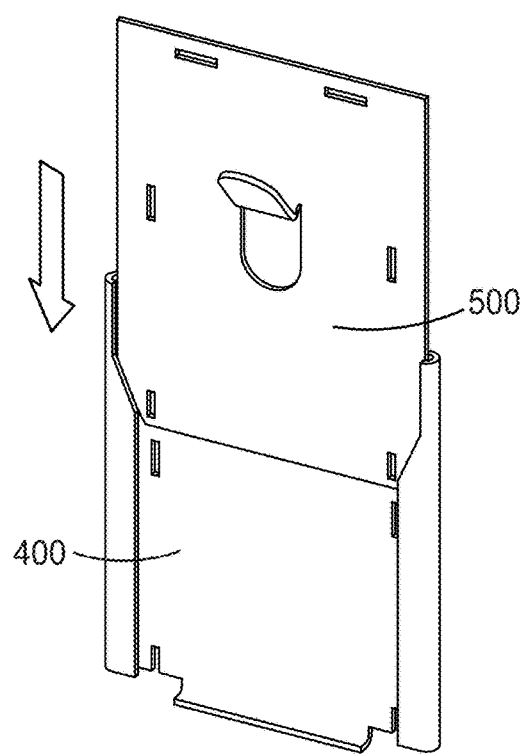
Figure 12F:
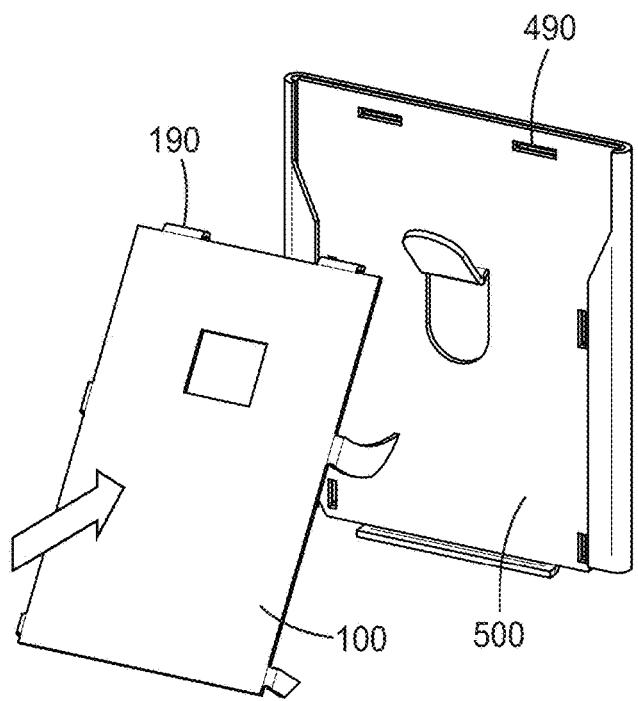
Figure 12G:
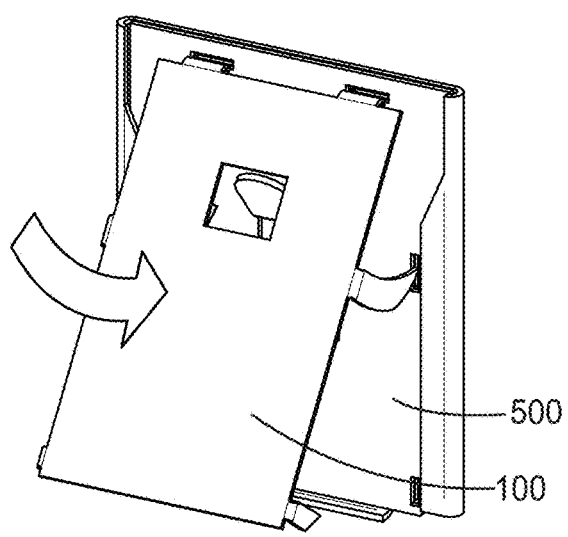
Figure 12H:
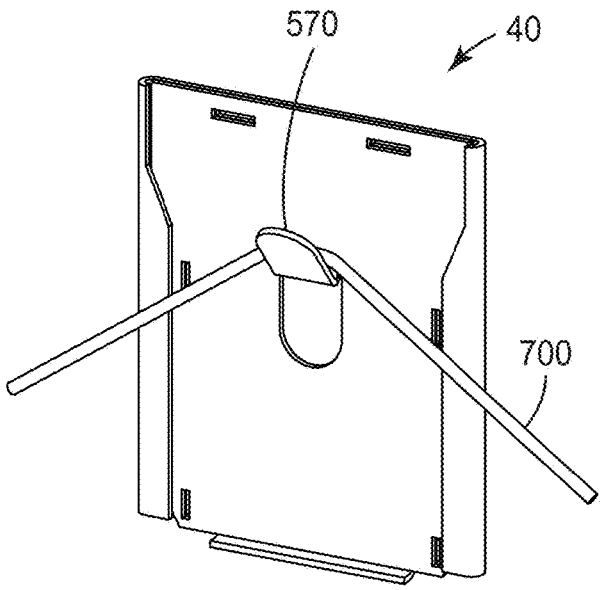
Figure 13:
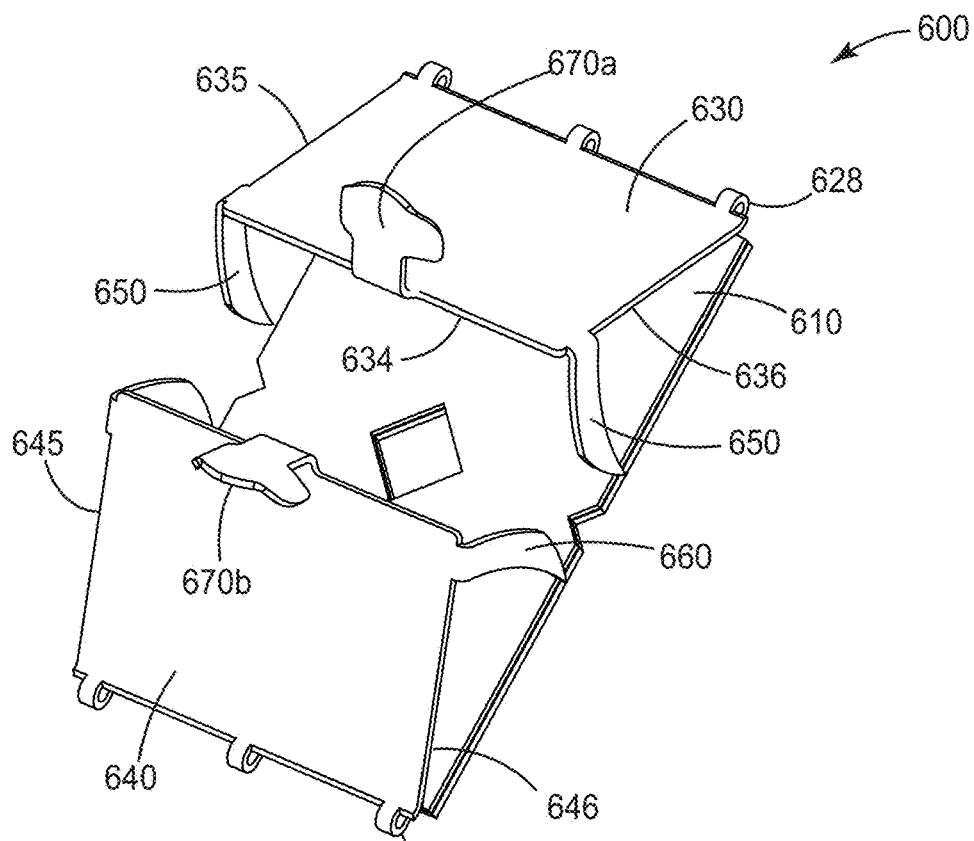
FIG. 13 illustrates a perspective view of a wall anchor assembly, according to yet another embodiment of the present disclosure.
Figure 14:
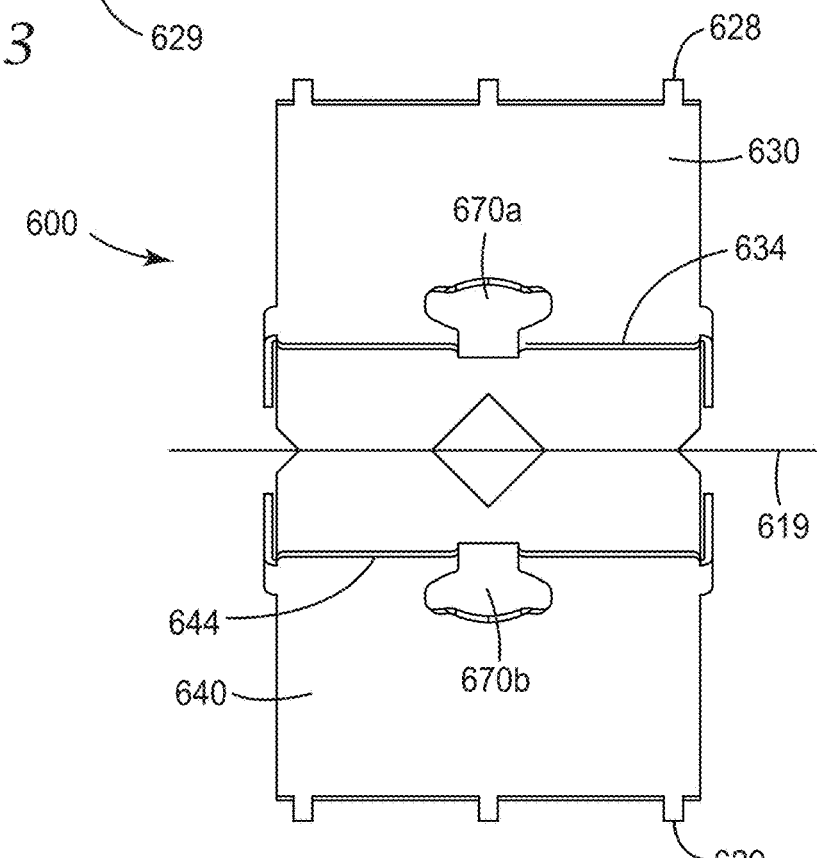
FIG. 14 is a front-planar view of the wall anchor assembly of FIG. 14.
Figure 15:
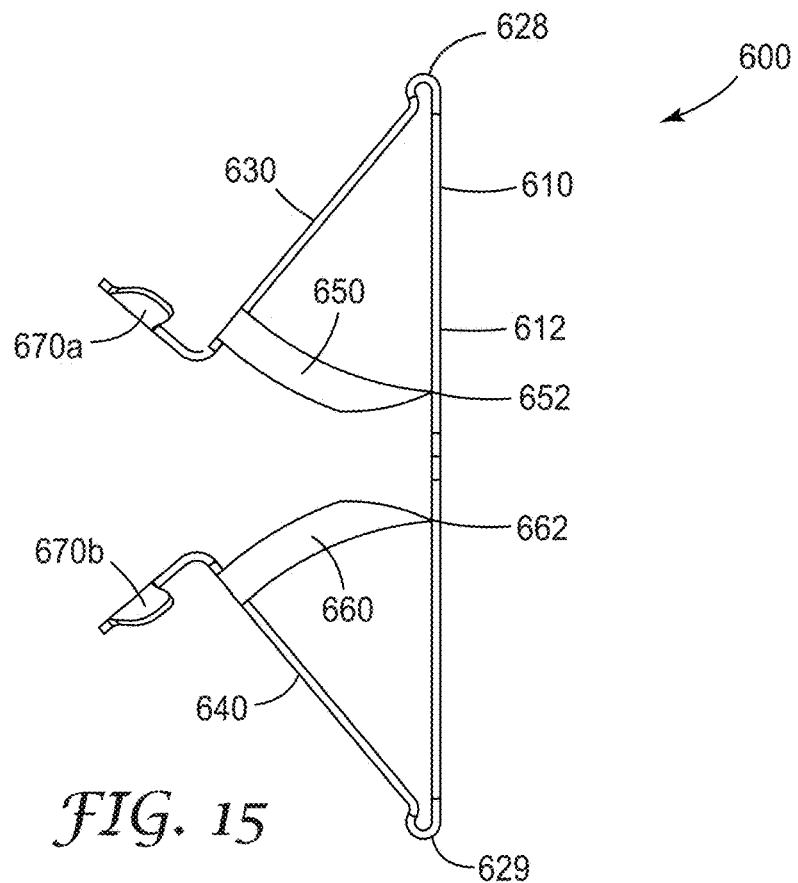
FIG. 15 is a side view of the wall anchor assembly of FIGS. 14-15.
Figure 16:
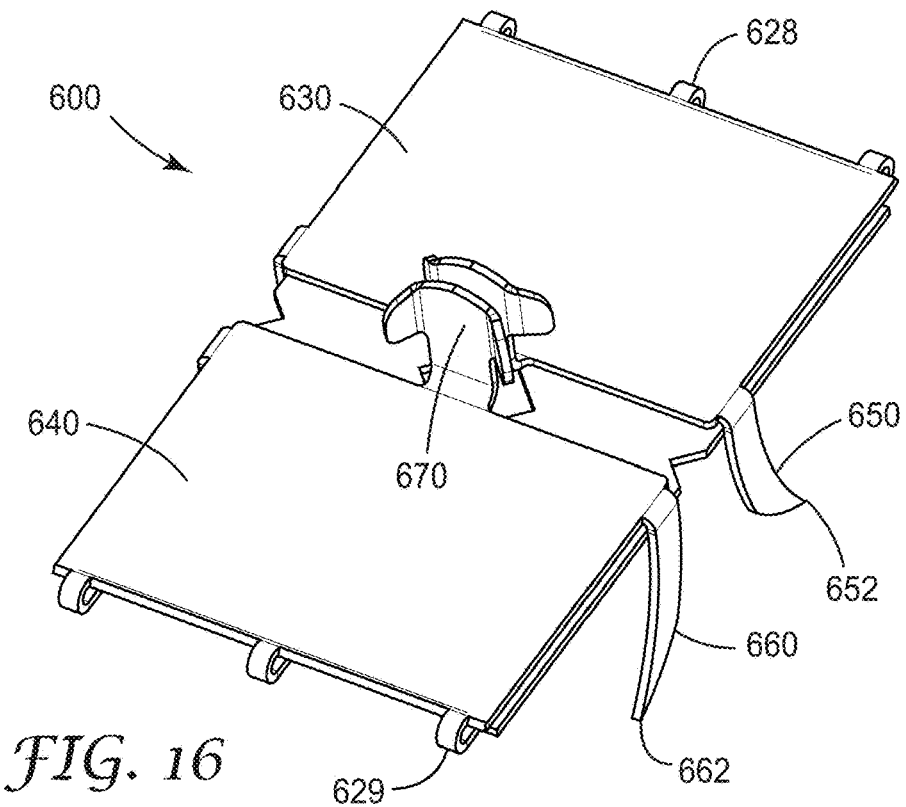
FIG. 16 is a perspective view of the wall anchor assembly of FIGS. 14-16 featuring the closing of the insert plates relative to the base plate.

A method of using the wall anchor assembly 40 is illustrated in FIGS. 12a-12h. In a first step, a partially assembled anchor assembly 40 is provided featuring the insert 500 received in the recess and the spacer pad 300 detachably secured to the front face 510. (FIG. 12A). Next, the mounting object (depicted here as wire 700) is placed on the load bearing structure 570 via, e.g., wire, bracket, or d-ring and the front surface 310 of the pad 300 is attached to the object (FIG. 12B). The user can position and orient the assembly at the desired location on the wall surface by moving (e.g., sliding or rotating) the mounting object directly (FIG. 12C). Once the user is satisfied with the location of the object, the user applies pressure on the object to adhere the assembly 40 to the wall. If a repositionable adhesive construction is used, the user may elect to first secure the frame to the wall and subsequently move to the desired position. The insert plate 500 can then be removed from the frame 400 by moving the object in the direction of the top edge 413 of the frame body (FIG. 12D). Following confirmation that the frame 400 is in the correct position and orientation, the user returns the insert plate 500 to the recess 430. (FIG. 12E). The arcuate tabs 190 on the anchor 100 are then placed in the rotation apertures 490, 590 or the anchor is otherwise aligned with the frame/insert plate assembly (FIG. 12F) and the anchor 100 can be rotatably inserted into the wall. (FIG. 12G). Once the anchor is substantially flush with the front surface 510 of the insert plate 500, the object may be once again secured to the load bearing structure 570 (FIG. 12H). Not all of these steps are necessarily required for all objects to be mounted or all wall surfaces.

Once assembled in final form on the wall, the upper surfaces of the guide apertures 550 of insert plate are essentially resting on (i.e., vertically supported by) the curved prongs 150 of the anchor 100. Alternatively, the lower surface of load bearing structure 570 rests on a portion of the anchor aperture 180. The insert plate 500 will be accordingly be rotationally constrained, and the load on the inset plate from the mounted object can be effectively transferred to the anchor 100 and the wall without causing the prongs 150 to rotate through and out of wallboard.

Turning to FIGS. 13-16, another pivotable wall anchor assembly 600 is depicted. The wall anchor assembly includes a base plate 610 pivotally coupled to two insert plates at opposing hinge segment 628 and 629: upper insert plate 630 and lower insert plate 640. Each insert plate 630, 640 includes a pair of curved prongs 650, 660, respectively. It is to be understood that many other aspects of anchor assembly 600 may have similar form and function to those described with respect to anchor 100, and these need not be repeated.

The upper insert plate 630 includes prongs 650 curving in the direction of hinge segment 628. The prongs 650 are located on the side edges 635, 636 of the upper plate 630 at a location near the distal edge 634 of the plate. The prongs 650 are spaced across the distal edge 634 such that the distance between the prongs is greater than the width of the base plate 610. In other embodiments, the base plate may feature guides similar to those of anchor assembly 40, with apertures in the base plate 610 spaced to receive the prongs

650. The distal edge 634 also includes an upper segment 670a of a load bearing projection 670. The distance between the hinge segment 628 and the distal edge 634 is approximately equal to the distance between the hinge segment 628 and the latitudinal center axis 619 of the base plate 610.

The lower insert plate 640 includes prongs 660 curving in the direction of hinge segment 629, or downward relative to the prongs 650. The prongs 660 are located on the side edges 645, 646 of the lower plate 640 at a location near the distal edge 644 of the plate. The prongs 660 are spaced across the distal edge 644 such that the distance between the prongs is greater than the width of the base plate 610. The distal edge 644 also includes a lower segment 670b of a load bearing projection 670. The distance between the hinge segment 629 and the distal edge 644 is approximately equal to or less than the distance between the hinge segment 629 and the latitudinal center axis 619 of the base plate 610.

Due in part to the existence of two sets of curved prongs 650, 660, the wall anchor assembly may be secured to the wall with hinge segment 628, 629 oriented either vertically or horizontally (or at an oblique angle relative to the central axis 619). The multiple orientations can allow a user to adapt to various space constraints where a vertical orientation may not be tenable. The back surface 612 of the base plate 610 may also feature a removable, positionable, and/or repositionable adhesive construction. The wall anchor assembly 60 can also be used to produce faint markings on the wall with prong outer ends 652, 662, allowing a user to judge position and orientation of the assembly on the wall surface without fully committing to insert the prongs 650, 660. Once a commitment has been made, the user may rotate both the upper and lower insert plates to insert the prongs 650, 660 until the insert plates 630, 640 are generally flush with the base plate 610 and the loading bearing segments 670a, 670b combine to provide a load bearing structure 670.

While depicted as having two insert plates 630, 640, the assembly 600 may features three or more insert plates pivotably coupled to base plate 610. The additional insert plates may be arranged in rows, columns, grids, or radial arrays, as some non-limiting examples. Some or all the additional insert plates can be arranged in opposing pairs; in other embodiments some or all may feature a discrete orientation with respect to the other plates. Some or all the additional insert plates may include load bearing segments that combine to form a load bearing structure, including in combination with a load bearing segment on the base plate.

The wall anchor assemblies of the present disclosure can be used even in instances where the object does not include a wire but instead includes a different backing hardware configuration. Exemplary backing hardware configurations include, but are not limited to, a "D"-ring, saw-tooth, key-hole hangers, etc.

Figure 17:
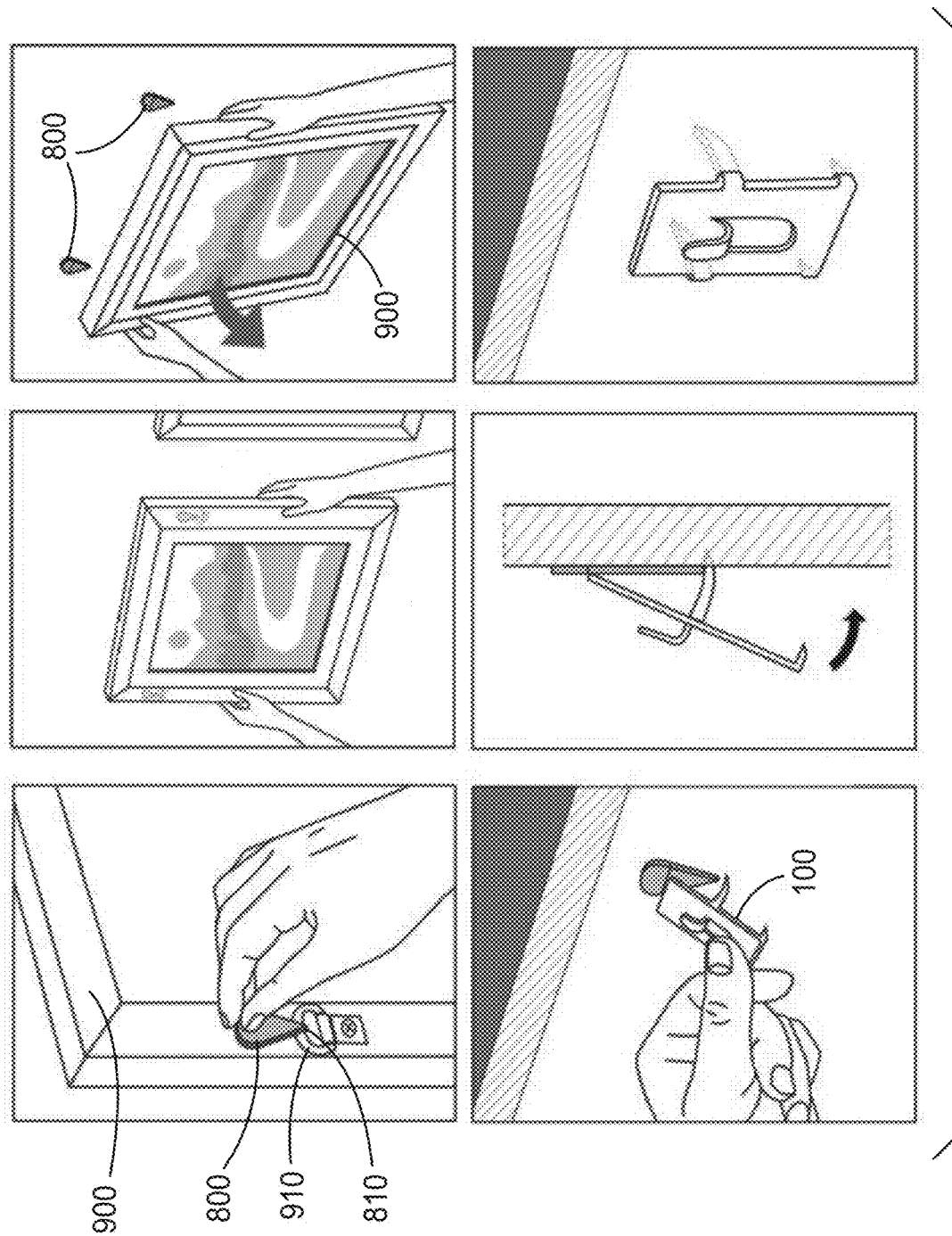
FIG. 17 is an instructional diagram illustrating the use of a wall anchor assembly according to another embodiment of the present disclosure.

FIG. 17 illustrates an embodiment of a wall anchor kit for mounting an object according to the present disclosure. The kit features transfer structures 800 having a removable and/or (re)positionable adhesive constructions of the type described above on opposing front and back major surfaces. The transfer structures 800 can include alignment features 810 configured to reside adjacent or within backing hardware and/or position the load bearing structure on a wall anchor at the correct location to engage the backing hardware. The transfer structures 800 typically include different adhesive properties between the construction on the front and back surfaces, in that the adhesive construction on the front surface (i.e., the surface intended to be attached to the object) typically forms a weaker bond to the object than the adhesive construction on the back surface forms with a wallboard or other wall surface. Accordingly, the object can be removed (e.g., peeled) from the transfer structure 800 without the structure being removed from the wall. The transfer structures may be formed from, for example, any of the materials used in creating the pillows or spacer pads described herein or any other material suitable for the designated purpose.

The kit may include, for example, two wall hangers of the type described herein and six transfers structures, though the exact number of any component in the kit is not limiting. Alternatively, the kit may only include two or more transfer structures. The transfer structures may also be used and provided in a kit with common hardware, such as nails, screws, and other forms of wall anchors.

In use, the transfer structures 800 can be secured to the back of an object, such as the picture frame 900 in FIG. 17. The transfer structures 800 are positioned on the object so that the alignment features 810 align with backing hardware or other desired location for engaging a wall anchor or conventional fastener (e.g., nail, screw, etc.). In FIG. 17, for example, the point 815 at the end of an alignment feature 810 is located within a D-ring recess 910. Once the user is satisfied with the location of the object (frame 900), the user applies pressure on the object to adhere the back surface of the one or more transfer structures 800 to the wall. If a repositionable or positionable adhesive construction is used on the back surface, the user may elect to first adhere the transfer structures to the wall and subsequently move to the desired position. The insert object can then be removed from the front surface of the transfer structures 800 by peeling or other mechanism. Following confirmation that the transfer structures 800 are in the correct position and orientation, the user aligns a wall anchor (such as wall anchor 100) and attendant load bearing structure with each transfer structure. The anchor(s) can be inserted into the wall. Once the anchor (or other fastener) reaches the desired position within the wall, the object may be secured to the load bearing structure.

Figure 18:
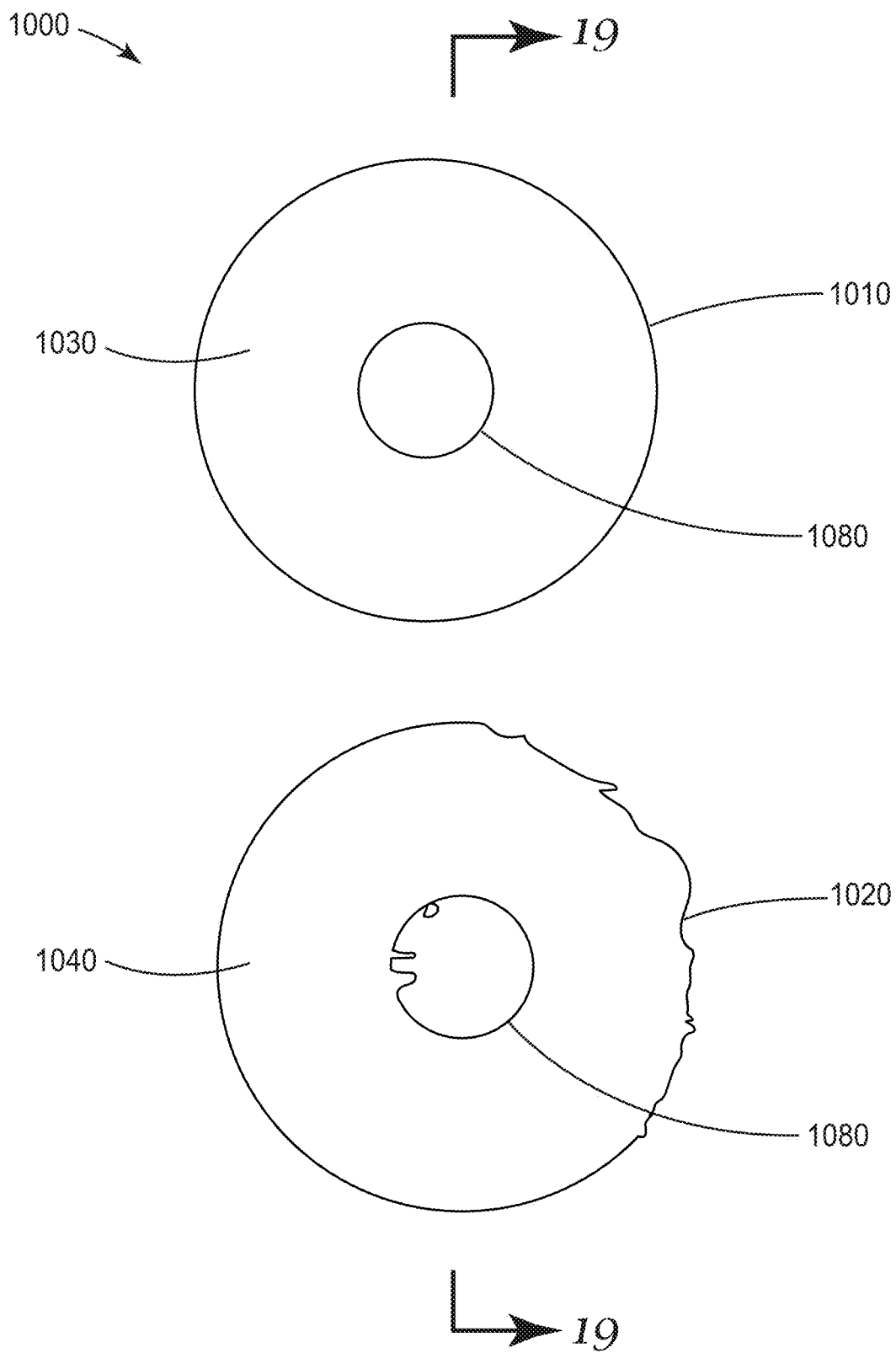
FIG. 18 is a perspective view of a transfer adhesive construction according to another embodiment of the disclosure.
Figure 19:
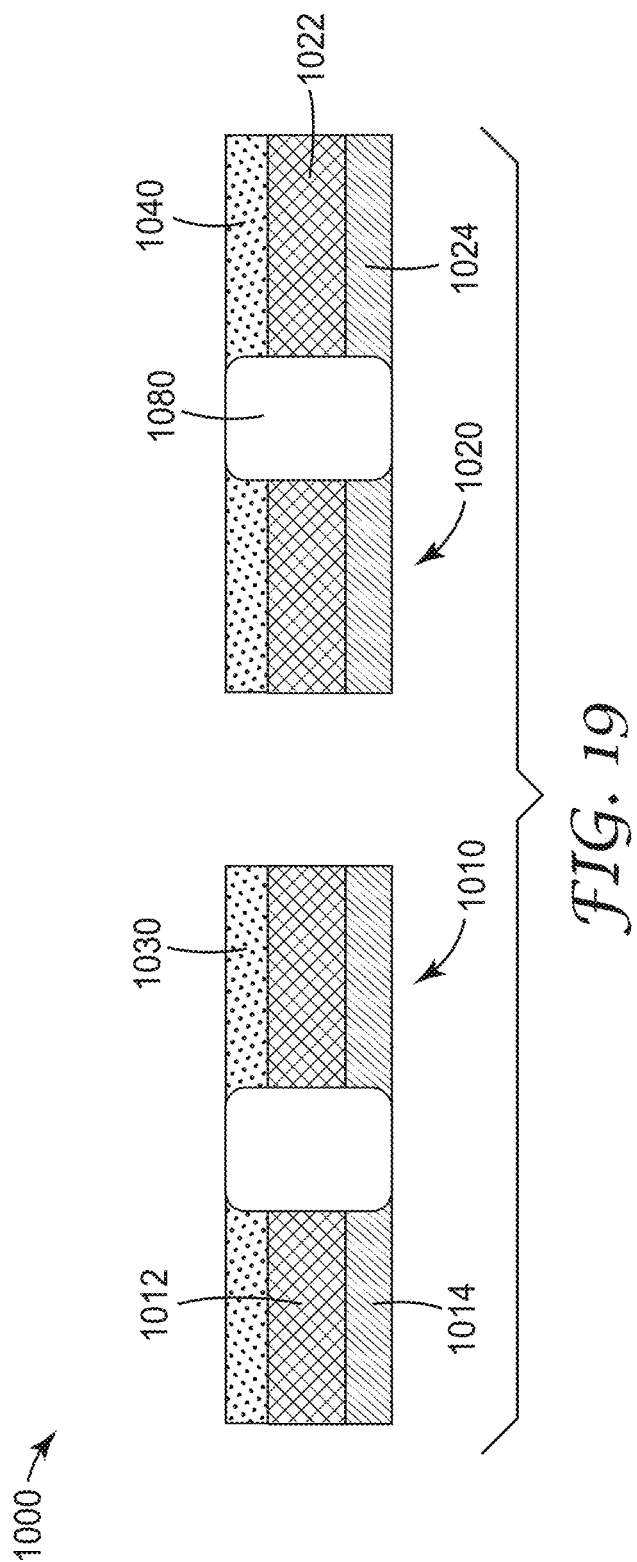
FIG. 19 is a side, cross-sectional view of the article of FIG. 18.

Another embodiment of the transfer structure concept is illustrated in FIGS. 18 and 19. The transfer structure 1000 includes a first adhesive transfer construction 1010 and a second adhesive transfer construction 1020. The first adhesive construction 1010 comprises a backing layer 1012 and an adhesive layer 1014 on a major surface of the backing layer 1012. Second adhesive construction 1020 likewise comprises a backing layer 1022 and adhesive layer 1024 of the same or different adhesive compositions as the first adhesive construction on a major surface of the backing layer 1022. Each adhesive layer 1014, 1024 may be single layer or multilayer. Each backing 1012, 1022 may likewise be single layer or multilayer. Adhesive layers 1014, 1024 can be the same as one another or disparate from one another. Disparate, in this context, is used to describe substantial differences in composition or adhesive performance. Adhesive layers 1014, 1024 can each be continuous or discontinuous (e.g., patterned) across the major surfaces of the requisite backing. The constructions have an overall, generally circular shape in a plane perpendicular to the backing surface. In other embodiments, the constructions present another shape or combination of shapes in the same viewing direction, including rectangular (inclusive of square), ovular, triangular, tetrahedral, Y-shaped, etc. Other variations are contemplated and discernable by those of skill in the art.

The adhesive transfer constructions 1010, 1020 can include alignment apertures 1080 at the center of each. The alignment apertures 1080 can be used to align with backing hardware or mark a wall surface with the desired location for placement of a wall anchor or conventional fastener (e.g., nail, screw, etc.). The alignment apertures 1080 may share the shape of the corresponding construction (as shown, both are circular) or may be different. The adhesive transfer constructions may include multiple alignment features, such as apertures 1080 and notches (not shown). Notches may be used to align features on the transfer construction with a notch 123 or similar feature on wall anchor 100, and indicate a location to mark a wall.

The external surfaces of the adhesive layers 1014, 1024 of the first and second adhesive transfer constructions 1010 and 1020 can be used to affix the transfer construction to the desired adherend, hardgood, and/or mounting object (e.g., a picture frame). One or both of the available adhesive layers 1014, 1024 may be covered by a release liner (not shown).

The first and second adhesive constructions 1010, 1020 may include a backing as depicted or may be backing free. Backing-free (i.e., carrier free) adhesive constructions are described, for example, in US Publication No. 2016/0068722 (Schmitz-Stapela et al.). As an alternative to a backing-borne adhesive construction, a backing-free or solid adhesive can be used instead of the combination of a backing with adhesive layers in either or both the first and second adhesive constructions 1010, 1020. A backing-free adhesive construction may itself comprise a plurality of adhesive materials provided as sublayers or mixtures or otherwise and may be provided in a way so that one adhesive surface is the same or different than its other adhesive surface. For example, two different adhesive compositions can be co-extruded so as to provide an adhesive construction comprising two different sublayers, one forming a first adhesive surface of a first expected adhesion to substrate and the other forming a second adhesive surface of a second expected adhesion. The expected adhesions may be the same or different, allowing one, for example, to be at least semi-permanent and the other to be removable without damage.

A backing, if used, can be a single layer or a multilayer construction. Materials forming the backing can include a paper, natural or synthetic polymer films, nonwovens made from natural and/or synthetic fibers and combinations thereof, fabric reinforced polymer films, fiber or yarn reinforced polymer films or nonwovens, fabrics such as woven fabric formed of threads of synthetic or natural materials. The backing may also be formed of metal, metallized polymer films, or ceramic sheet materials in combination with at least one of the above. In some embodiments, the backing is a multilayered film having two or more layers; in some such embodiments the layers are laminated. For example, the backing can be formed of a foam, a film, or a combination thereof with any suitable thickness, composition, and opaqueness or clarity.

The transfer structure 1000 includes a separable connection system between the first and second adhesive transfer constructions 1010, 1020. The separable connection system includes a first connector member 1030 disposed on the second major surface of the first adhesive construction 1010, and a second connector member 1040 disposed on the second major surface of second adhesive construction 1020. The first and second separable connector members 1030 and 1040 are engageable with each other to form a separable connection, thereby detachably connecting the transfer constructions 1010, 1020: the first connector member 1030 remains with the first adhesive construction 1010 and the second connector member 1040 remains with the second construction 1020 after separation of the separable connection 1030. Certain advantages of the articles are based upon the incorporation of a separable connection 16 between the first and second adhesive constructions 1010 and 1020, as a mounting object can be separated from a mounting surface without destruction of either adhesive transfer construction 1010 or 1020. The first and second connector members 1030 and 1040 are typically co-extensive with and cover the similar areas as the adhesive layers.

Any suitable technique or techniques may be utilized by the user to suitably reconnect the first and second separable connecting members 1030, 1040.

The separable connection can include any known or developed reusable connector for connecting the adhesive transfer constructions 1010, 1020. The separable connection 1030 permits the separation and connection of the first and second adhesive constructions 1010, 1020 along a general plane. In some embodiments, the separable connection can include, for example, a mechanical type fastener including an interlocking system, an intermeshing system having connection without macroscopic mechanical deformation or interference, a releasable contact responsive fastener, a splittable construction, and the like. In other embodiments, the separable connector includes one or more layers of an adhesive, gel, or gel adhesive bound by covalent bonding, ionic bonding, hydrogen bonding, and/or van der Waals forces.

In some embodiments, the first separable connecting member 1030 can include a layer of hook material, and the second separable connecting member 1040 can also include a layer of hook material or loop material. It is contemplated that any commercially available hook and loop connector system, including those available from 3M Company, can be utilized. Hook and loop connector systems are but one type of mechanical interlocking connector systems which are suggested by this embodiment. By mechanical interlocking, it is meant those fasteners where at least one of the connector elements undergoes some macroscopic deformation (preferably plastic deformation) so that a mechanical interference results between plural components. Many different modifications of the inter-engaging elements are designed based on the requisite force and manner of separation between the cooperating layers of such a separable connector system. Some exemplary separable connectors are described in, for example, U.S. Pat. Nos. 6,572,945; 7,781,056; 6,403,206; and 6,972,141, all of which are incorporated by reference in their entirety herein.

The separable connecting members 1030, 1040 can be connected to adhesive constructions 1010, 1020 using any suitable technique or techniques. In one or more embodiments, separable connecting members 1030, 1040 are adhered to the requisite adhesive construction using any suitable adhesive or combination of adhesives, including any of the hot melt adhesives described further herein. Further, in one or more embodiments, separable connecting members 1030, 1040 can be ultrasonically bonded to the requisite adhesive construction 1010, 1020. In one or more embodiments, the separable connecting members 1030, 1040 can be mechanically attached to the requisite adhesive construction using any suitable technique or techniques. In one or more embodiments, a tie layer as described herein in any of its embodiments may be disposed between one or both of the first and second connecting members 1030, 1040 and the first and second adhesive construction 1010, 1020, respectively.

In use, the transfer structures 1000 can be secured to the back of an object. The transfer structures 1000 are positioned on the object so that the alignment features align with backing hardware or other desired location for engaging a wall anchor or conventional fastener (e.g., nail, screw, etc.).

Once the user is satisfied with the location of the object, the user applies pressure on the object to adhere the back surface of the one or more transfer structures to the wall. If a repositionable or positionable adhesive construction is used on the back surface, the user may elect to first adhere the transfer structures to the wall and subsequently move to the desired position. The object can then be removed from the front surface of the transfer structures at the detachable interface. Following confirmation that the transfer structures are in the correct position and orientation the user can use alignment features (e.g., a notch or aperture 1080) to mark the desired location of a corresponding feature of the anchor or other fastener on the wall. The user then aligns a wall anchor (such as wall anchor 100) or other fastener with either the alignment feature or a mark made on the wall using the alignment feature. The anchor(s) or fastener can be inserted into the wall. Once the anchor (or other fastener) reaches the desired position within the wall, the object may be secured to a load bearing structure.

Notably, the transfer structure(s) as described above may take the shape and characteristics of pillow 200 above, with or without insertion guides 240. Such a pillow (e.g., one including a separable connection system and one or more adhesive surfaces) may include one or more alignment features, and in particular embodiments includes both an alignment aperture and an alignment notch on an edge of the pillow to ease wall marking.

A wall anchor 2000 according to another embodiment of the present disclosure is depicted in FIGS. 20-22. Unless specifically noted, the considerations and elements of anchor 2000 are the same as anchor 100 and need not be repeated here. The wall anchor 2000 includes a base plate 2010 presenting a generally rectangular shape (as seen in FIG. 22). The base plate 2010 includes a front surface 2011 opposing a back, wall-facing surface 2012, a top edge 2013, a bottom edge 2014, and opposing side edges 2015, 2016 connecting the top and bottom edges 2013, 2014 to define an outer plate perimeter. A pair of downwardly curved prongs 2050 extend from each side edge 2015, 2016 in direction generally orthogonal to the back surface 2012. The prongs 2050 extend to an outer end that can be tapered to ease insertion when pressed into wall board or other mounting surfaces. The wall anchor 2000 (or a plurality of wall anchors 2000) may also be pivotally coupled to a base.

The insertion and removal methods for wall anchor 2000 (and other anchors featuring downwardly curved prongs) is essentially the inverse of the method depicted in FIGS. 6A and 6B, in that the anchor is rotated about an axis nearer the bottom edge 2013 to insert and disengage prongs 2050.

The wall anchors and anchor assemblies of the present disclosure may be used to mount myriad items and objects to surfaces such as painted drywall, plaster, concrete, glass, ceramic, fiberglass, metal or plastic. Items that can be mounted include, but are not limited to, wall hangings, organizers, holders, baskets, containers, decorations (e.g., holiday decorations), calendars, posters, dispensers, wire clips, guitars, floating shelves, curtain rods, heavy-duty hooks, brackets, wall sconces, and carrying handles.

Embodiments

1. A wall anchor assembly comprising: a wall anchor including a base plate and a first prong; and a pillow having an adhesive construction on a major surface thereof.

2. The wall anchor assembly of embodiment 1, wherein the adhesive construction is at least one of positionable and repositionable.

3. The wall anchor assembly of embodiment 1 or 2, wherein the adhesive construction is stretch releasable.

4. The wall anchor assembly of embodiments 1-3, wherein the pillow is compressible.

5. The wall anchor assembly of embodiments 1-4, and further including a spacer pad integral with at least a portion of the pillow.

6. The wall anchor assembly of embodiments 1-5, wherein the base plate includes opposing side edges, and wherein the base of the prong is integral with one of the opposing side edges.

7. The wall anchor assembly of embodiments 1-6, wherein the base plate further comprising a hook, and wherein the bottom of the hook is disposed in a plane parallel to or above a top edge of a base of the prong.

8. The wall anchor assembly of embodiments 1-6, wherein the prong curves upwardly or downwardly in the direction of the top edge.

9. The wall anchor assembly of any one of embodiments 1-8 and further including a second curved prong extending outwardly along an arc to an outer end.

10. The wall anchor assembly of embodiment 9, wherein the outer end of the first prong and the outer end of the second prong are coplanar.

11. The wall anchor assembly of embodiment 10, wherein each prong curves upwardly or downwardly in the direction of a top edge of the base plate.

12. The wall anchor assembly of any one of embodiments 1-11, wherein the pillow includes at least one insertion guide for receiving the prong.

13. The wall anchor assembly of any one of embodiments 1-12, wherein the base plate includes a front surface and a back surface, and wherein, when the assembly is assembled, the back surface of the base is flush with the front surface of the frame.

14. The wall anchor assembly of embodiment 13, wherein the spacer pad includes a front surface and a back surface, and wherein the back surface of the spacer pad is flush with the front surface of the base plate when the anchor assembly is assembled.

15. The wall anchor assembly of embodiment 14, wherein the back surface of the spacer pad includes a detachable interface.

16. The wall anchor assembly of any of the previous embodiments, wherein the base of the prong has a height measured along a side edge of the base plate and a thickness measured along a top edge of the base plate, and wherein the height is a least twice the thickness.

17. The wall anchor assembly of embodiment 16, wherein the height is at least three times the thickness.

18. A wall anchor assembly comprising: a frame having a front surface and a back surface, the frame including a guide on its front surface configured to receive an insert plate, the insert plate including a load bearing structure; an anchor including a curved prong having a base, wherein the prong extends outwardly along an arc to a wall-penetrating outer end; and wherein the back surface of the base plate includes an adhesive construction.

19. The wall anchor assembly of embodiment 18, wherein the base plate is pivotally coupled to the insert plate at a first hinge segment.

20. The wall anchor assembly of embodiment 19, wherein the first hinge segment is disposed proximate a top edge of the base plate and a proximal edge of the insert plate.

21. The wall anchor assembly of embodiment 18, wherein the base plate includes a guide aperture dimensioned for receipt of the prong.

22. The wall anchor assembly of embodiments 18-21, wherein the frame includes a recess, and wherein a portion of the insert plate is dimensioned to fit within the recess.

23. The wall anchor assembly of embodiment 18, wherein the base of the prong has a height measured along the side edge and a thickness measured along the top edge, and wherein the height is a least twice the thickness.

24. The wall anchor assembly of embodiment 23, wherein the height is at least three times the thickness.

25. The wall anchor assembly of embodiment 18, wherein the prong curves upwardly or downwardly in the direction of the proximal edge.

26. The wall anchor assembly of embodiment 18 and further including a second curved prong extending outwardly along an arc to an outer end.

27. The wall anchor assembly of embodiment 26, wherein the outer end of the first prong and the outer end of the second prong are coplanar.

28. The wall anchor assembly of embodiment 26, wherein the base of the second prong is integral with one of the opposing side edges.

29. The wall anchor assembly of embodiment 28, wherein the base of the second prong is integral with the side edge opposite the side edge integral with the first prong base.

30. The wall anchor assembly of embodiment 18, wherein the adhesive construction is at least one of positionable or repositionable.

31. The wall anchor assembly of embodiments 18-30, wherein the guide includes two or more rails, and wherein the rails include a guide surface acting on a front face of the insert plate.

32. A wall anchor assembly comprising: a base plate including opposing major surfaces; a first insert plate pivotably coupled to an edge of the base plate at a first hinge segment, a second insert plate pivotably coupled to the base plate at a second hinge segment disposed at an opposite edge of the base plate from the first hinge segment; and an adhesive construction on a major surface of the base plate, wherein each insert plate includes a curved prong extending from a surface of the respective insert plate at a location distal to the hinge segment.

33. The wall anchor assembly of embodiment 32, wherein the prongs curve in opposite direction when the first insert plate and the second insert plate are pivoted to be adjacent a major surface of the base plate.

34. A method for mounting an object, the method comprising: a providing an anchor assembly according to any one of embodiments 1-33; temporarily attaching a back surface of the assembly to a wall at a first location; placing the object on a loading bearing structure of the anchor assembly; manipulating, directly, the object so that the anchor assembly is disposed at a second location; and removing the object from the load bearing structure.

35. The method of embodiment 34, and further comprising creating a positioning mark in the wall proximate the second location with a prong of the anchor assembly.

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof.

Further, various modifications and alterations of the present invention will become apparent to those skilled in the art without departing from the spirit and scope of the invention. The scope of the present application should, therefore, be determined only by the following claims and equivalents thereof

We claim:

1. A wall anchor assembly comprising:
a base plate including opposing major surfaces;
a first insert plate pivotably coupled to an edge of the base plate at a first hinge segment,
a second insert plate pivotably coupled to the base plate at a second hinge segment disposed at an opposite edge of the base plate from the first hinge segment,
wherein each insert plate includes a curved prong extending from a surface of the respective insert plate at a location distal to the hinge segment, and
wherein each insert plate includes opposing side edges, and wherein each curved prong includes a base, and the base is integral with one of the opposing side edges of its respective insert plate.

2. The wall anchor assembly of claim 1, wherein the prongs curve in opposite directions when the first insert plate and the second insert plate are pivoted to be adjacent a major surface of the base plate.

3. The wall anchor assembly of claim 1, wherein each insert plate includes a hook segment disposed adjacent an edge of the plate distal to the hinge segment, and wherein the hook segments are cooperable to form a load bearing structure when the first insert plate and the second insert plate are pivoted to be adjacent a major surface of the base plate.

4. The wall anchor assembly of claim 1, wherein the base plate includes an adhesive construction on one of the major surfaces.

5. The wall anchor assembly of claim 4, wherein the adhesive construction is stretch releasable.

6. The wall anchor assembly of claim 4, wherein the adhesive construction is at least one of positionable and repositionable.

7. The wall anchor assembly of claim 1, wherein each insert plate includes a first curved prong and a second curved prong, each extending from a surface of the respective insert plate at a location distal to the hinge segment.

8. The wall anchor assembly of claim 7, wherein each curved prong has a downward curvature with respect to a top edge of the respective insert plate.

9. The wall anchor assembly of claim 1, wherein the first insert plate includes a second curved prong extending outwardly along an arc to an outer end, and wherein the outer end of the first prong and the outer end of the second prong are coplanar.

10. A kit comprising
a wall anchor; and
one or more transfer structures, each transfer structure including a separable connection system and a marking aperture,
wherein the transfer structures each comprise:
a first adhesive layer and a first separable connector component coupled to the adhesive layer; and a second adhesive layer and a second separable connector component, wherein the first and second separable connector components are engageable with each other to form the separable connection system.

11. The kit of claim 10, wherein the wall anchor comprises a base plate including opposing front and back surfaces, a top edge, a bottom edge and two opposing side edges; and a curved prong having a base, wherein the prong extends outwardly along an arc to a wall-penetrating outer end, and wherein the base of the prong is integral with one of the opposing side edges.

12. The kit of claim 11, wherein the wall anchor further includes a second curved prong extending outwardly along an arc to an outer end, wherein the outer end of the first prong and the outer end of the second prong are coplanar, and wherein each prong curves downwardly in the direction of the bottom edge.

13. The kit of claim 10, wherein the first separable connector component includes a hook material, and wherein the second connector component includes at least one or a hook material or a loop material.

14. The kit of claim 10, wherein, when the transfer structure is assembled, the first and second adhesive layers define opposing major surfaces of the transfer structure.

15. The kit of claim 10, wherein the wall anchor comprises a base plate including opposing front and back surfaces, a top edge, a bottom edge and two opposing side edges; and a curved prong having a base, wherein the prong extends outwardly along an arc to a wall-penetrating outer end, and wherein the base of the prong is integral with one of the opposing side edges, and further comprising a pillow including an aperture for receipt of the prong.

16. A method for mounting an object, the method comprising:
   a providing an anchor assembly including one or more prongs;
   temporarily attaching a back surface of the assembly to a wall at a first location;
   placing the object on a loading bearing structure of the anchor assembly;
   manipulating, directly, the object so that the anchor assembly is disposed at a second location;
   creating a positioning mark in the wall proximate the second location; and
   removing the object from the load bearing structure.

17. The method of claim 16, and further comprising rotate the prongs into the wall.

* * * * *

UNITED STATES PATENT AND TRADEMARK OFFICE
CERTIFICATE OF CORRECTION

PATENT NO. : 11,629,748 B2  
APPLICATION NO. : 17/057046  
DATED : April 18, 2023  
INVENTOR(S) : Joseph A Hoffman Page 1 of 1

It is certified that error appears in the above-identified patent and that said Letters Patent is hereby corrected as shown below:

In the Claims

<u>Column 24</u>  
Line 11, In Claim 16, delete "loading" and insert -- load --, therefor.

Signed and Sealed this  
Seventh Day of January, 2025

Derrick Brent  
*Acting Director of the United States Patent and Trademark Office*